US012769410B1

(12) United States Patent
King, Jr.

(10) Patent No.: US 12,769,410 B1
(45) **Date of Patent: *Oct. 20, 2026**

(54) ELECTRONIC DEVICE ADAPTED TO APPLY A WRITING TO A SURFACE AND METHOD OF IMPLEMENTING AN ELECTRONIC DEVICE

(71) Applicant: John J. King, Jr., Wheaton, IL (US)

(72) Inventor: John J. King, Jr., Wheaton, IL (US)

( * ) Notice: Subject to any disclaimer, the term of this patent is extended or adjusted under 35 U.S.C. 154(b) by 265 days.

This patent is subject to a terminal disclaimer.

(21) Appl. No.: 17/717,106

(22) Filed: Apr. 10, 2022

Related U.S. Application Data

(63) Continuation of application No. 16/513,258, filed on Jul. 16, 2019, now Pat. No. 11,301,063.

(60) Provisional application No. 62/718,093, filed on Aug. 13, 2018, provisional application No. 62/699,766, filed on Jul. 18, 2018.

(51) Int. Cl.

| | |
|---|---|
| ***G06F 3/0354*** | (2013.01) |
| ***G06V 30/244*** | (2022.01) |
| ***G06V 30/32*** | (2022.01) |

(52) U.S. Cl.
CPC ...... *G06F 3/03546* (2013.01); *G06V 30/2445* (2022.01); *G06V 30/32* (2022.01)

(58) Field of Classification Search
None
See application file for complete search history.

(56) References Cited

U.S. PATENT DOCUMENTS 5,294,792 A 3/1994 Lewis et al.
6,970,600 B2 11/2005 Abe
7,136,054 B2 11/2006 Wang et al.
7,203,838 B1 4/2007 Glazer et al.
7,546,524 B1 6/2009 Bryar et al.
7,660,011 B2 2/2010 Silverbrook et al.
7,715,049 B2 5/2010 Walmsley
7,773,263 B2 8/2010 Walmsley et al.
7,860,349 B2 12/2010 Silverbrook et al.
7,884,811 B2 2/2011 Paratore et al.
7,894,100 B2 2/2011 Silverbrook et al.
7,969,409 B2 6/2011 Krepec
8,019,184 B2 9/2011 Silverbrook et al.
8,081,171 B2 12/2011 Adams et al.
8,102,554 B2 1/2012 Silverbrook et al.
(Continued)

FOREIGN PATENT DOCUMENTS

EP 0856810 8/1998

OTHER PUBLICATIONS

Livescribe 3 Smartpen, Basics Guide, 2015.
(Continued)

*Primary Examiner* — Anand P Bhatnagar

(57) ABSTRACT

An electronic device adapted to apply information to a surface is described. The electronic device comprises a writing element adapted to apply a writing to the surface; a detection circuit adapted to detect the writing applied to the surface; and a control circuit coupled to the detection circuit; wherein the control circuit receives inputs from the detection circuit identifying portions of the writing in a plurality of images captured by the detection circuit to enable creating a single image based upon the plurality of images; and wherein the detection circuit identifies portions of the writing without the use of identification markers on the surface.

20 Claims, 19 Drawing Sheets

(56) References Cited

U.S. PATENT DOCUMENTS 8,300,252 B2 10/2012 Marggraff et al.
8,416,218 B2 4/2013 Marggraff et al.
8,657,397 B2 2/2014 Aubouy et al.
8,670,027 B1 3/2014 Schaffer
8,842,100 B2 9/2014 Edgecomb et al.
9,052,756 B2 6/2015 Yeh et al.
9,092,107 B2 7/2015 Yeh et al.
9,195,697 B2 11/2015 Black et al.
9,250,718 B2 2/2016 Marggraff et al.
9,269,488 B2 2/2016 Obata
9,297,633 B2 3/2016 Obata
9,335,838 B2 5/2016 Black et al.
9,354,725 B2 * 5/2016 Al-Sharif ............ G06F 3/03542
9,679,179 B2 6/2017 De Muelenaere et al.
9,753,555 B2 9/2017 Lee et al.
9,934,430 B2 * 4/2018 Dolfing .................. G06N 20/00
10,043,093 B2 8/2018 Allerdings et al.
10,217,264 B2 * 2/2019 Vaganov ............. G06F 3/03545
10,248,652 B1 * 4/2019 Venkataraman .... G06F 3/03545
10,296,787 B2 5/2019 Angelov et al.
10,444,859 B2 10/2019 Yao
10,504,215 B2 12/2019 Tsarenko et al.
10,551,942 B2 * 2/2020 Nakamura .......... G06F 3/04883
10,589,562 B2 3/2020 Kaneda et al.
10,649,547 B2 5/2020 Karasawa
10,684,771 B2 * 6/2020 Kim ...................... G06F 40/274
10,747,339 B2 8/2020 Angelov et al.
10,915,185 B2 2/2021 Robinson
10,996,771 B2 5/2021 Youn
10,997,402 B2 5/2021 Kim et al.
11,016,583 B2 5/2021 Robison
11,025,681 B2 6/2021 Port
11,048,345 B2 * 6/2021 Hung .................. G06F 3/04845
11,048,346 B1 6/2021 Burk et al.
11,158,097 B2 10/2021 Sandsmark et al.
11,176,361 B2 * 11/2021 Young ................... G06F 40/171
11,755,195 B2 9/2023 Weber
11,775,083 B2 10/2023 Hara et al.
11,775,147 B2 10/2023 Ide
11,782,526 B2 10/2023 Aoki et al.
11,797,109 B2 10/2023 Matsumoto
11,853,489 B2 12/2023 Horie
11,880,514 B2 1/2024 Kanno et al.
11,880,563 B2 1/2024 Onoda et al.
11,893,173 B2 2/2024 Aoki et al.
11,899,856 B2 2/2024 Sato et al.
11,900,512 B2 2/2024 Ide
11,906,384 B2 2/2024 Kaneda et al.
11,907,524 B2 2/2024 Nomi et al.
11,921,938 B2 3/2024 Bell
11,934,592 B2 3/2024 Manukata et al.
2003/0122803 A1 7/2003 Chuang
2004/0041798 A1 * 3/2004 Kim ........................ G06F 1/169
345/179
2006/0209042 A1 * 9/2006 Cohen ................. G06F 3/03545
345/173
2006/0209043 A1 * 9/2006 Cohen .................... G06V 30/32
345/173
2007/0123301 A1 5/2007 Wu et al.
2008/0122790 A1 5/2008 Cheng et al.
2008/0192305 A1 8/2008 Walmsley et al.
2008/0205762 A1 8/2008 Lapstun et al.
2009/0091639 A1 4/2009 Silverbrook et al.
2009/0277698 A1 11/2009 Silverbrook et al.
2010/0045785 A1 * 2/2010 Carl ....................... H04N 7/183
348/207.1
2010/0207898 A1 8/2010 Cha
2010/0232730 A1 9/2010 Silverbrook et al.
2010/0315425 A1 * 12/2010 Cohen ..................... G06F 3/013
382/187
2011/0240733 A1 10/2011 Lapstun et al.
2012/0099147 A1 4/2012 Tanaka et al.
2012/0194486 A1 8/2012 Kajitani et al.
2013/0076702 A1 3/2013 Lapstun et al.
2013/0321356 A1 * 12/2013 Al-Sharif ............ G06F 3/03542
345/179
2014/0099153 A1 4/2014 Pemberton-Pigott
2014/0176512 A1 6/2014 Srinivas et al.
2015/0058718 A1 * 2/2015 Kim .................. G06V 30/1423
715/268
2015/0116282 A1 4/2015 Black et al.
2015/0248390 A1 * 9/2015 Gormish ............... G06F 40/169
715/233
2016/0018910 A1 1/2016 Walloth
2016/0147317 A1 5/2016 Vandermeijden
2016/0188011 A1 6/2016 Lee et al.
2017/0024122 A1 1/2017 Jung et al.
2017/0024417 A1 * 1/2017 Lee .................... G06V 30/1423
2017/0061182 A1 3/2017 De Muelenaere et al.
2017/0329424 A1 * 11/2017 Nakamura ........... G06V 10/235
2020/0278768 A1 * 9/2020 Kim ...................... G06V 10/56

OTHER PUBLICATIONS

Moleskine Pen + Ellispe, User Manuel, published 2018.
Neo Smart Pen N2, published 2015.
An Accelerometer-Based Digital Pen With a Trajectory Recognition Algorithm For Handwritten Digit and Gesture Recognition, IEEE Xplore Article, published Jul. 2012.
Smart Pen and Related Method for Detecting Ink Applied By a Smart Pen Onto a Writing Surface. Published Oct. 6, 2017.

* cited by examiner

ELECTRONIC DEVICE ADAPTED TO APPLY A WRITING TO A SURFACE AND METHOD OF IMPLEMENTING AN ELECTRONIC DEVICE

The present invention relates generally to electronic devices, and in particular to electronic devices, such as a smart pen device and a method of implementing an electronic device. Applicant claims priority to U.S. Appl. No. 62/718,093 filed on Aug. 13, 2018, US Appl. No. 62,699,766 filed on Jul. 18, 2018, and U.S. application Ser. No. 16/513, 258 filed on Jul. 16, 2019, the entire applications of which are incorporated herein by reference.

TECHNICAL FIELD

Background

While the demand for mobile electronics devices continues to grow, there is also need for improved and increased functionality of mobile devices. More particularly, smaller electronic devices may be more convenient to carry, but the reduced size may adversely affect the functionality of the smaller electronic device. For example, it may be more difficult to input data or other information to the electronic device. Also, an input element for the electronic device may have limited functionality, and generate only a single format of the recorded information, which may not be the most convenient format for the user. Further, the user may have no choice but to record the information in the only available format.

Many mobile communication devices lack conventional means of creating text or images, such as creating text or images using a pen or pencil. As mobile communication devices continue to become smaller, and particularly devices that are small enough to be used as a pen or pencil, there is often a loss of functionality with the reduction in size. That is, the user interface is often compromised, provides reduced features, or is otherwise more difficult to utilize conventional features.

While smart pens exist for recording text or images, such conventional smart pens have limited utility in inputting the text or images, and a very limited functionality for transferring the text or images to other formats. For example, many conventional smart pens require that a special paper having markers on the paper that are used by the smart pen to identify the location of the entered text or images, and do not allow any collaboration with other devices. Other conventional smart pens require an external element to function.

More companies, academic institutions, and even individuals are becoming "paperless" for document retention. However, even with the ability to create documents on an electronic device separate from a smart pen, such as a laptop, an individual may not have their laptop with them or may not be in an environment enabling them to use their laptop. Creating an electronic document from a paper documents may require time consuming action by an owner of the document, such as scanning the document using a separate scanner to create an electronic version of the document, such as a PDF version. Such a requirement may result in the information on the paper document being lost, as a user may fail to make an electronic copy before the document is discarded or lost.

Accordingly, there is a need for smart pen devices having improved functionality for entering information, such as text or images, and for communicating the information to other locations.

Accordingly, there is a further need for a mobile electronic device that provides flexibility in recording information, and converting the information to a different format, and enabling collaboration with other users.

SUMMARY

An electronic device adapted to apply information to a surface is described. The electronic device comprises a writing element adapted to apply a writing to the surface; a detection circuit adapted to detect the writing applied to the surface; and a control circuit coupled to the detection circuit; wherein the control circuit receives inputs from the detection circuit identifying portions of the writing in a plurality of images captured by the detection circuit to enable creating a single image based upon the plurality of images; and wherein the detection circuit identifies portions of the writing without the use of identification markers on the surface.

Another electronic device adapted to apply information to a surface comprises a writing element adapted to apply a writing to the surface; a first detection circuit adapted to detect the writing applied to the surface; a second detection circuit comprising a motion detector adapted to detect a motion of the electronic device with respect to the surface; and a control circuit coupled to the first detection circuit and the second detection circuit, wherein the control circuit receives inputs from first detection circuit identifying portions of the writing and inputs from the second detection circuit associated with motions of the electronic device to enable creating an image; wherein the detection circuit identifies portions of the writing without the use of identification markers on the surface.

According to another implementation, an electronic device adapted to apply information to a surface may comprise a writing element adapted to apply a writing material to the surface; a detection circuit comprising a camera adapted to detect the writing applied to the surface, wherein the detection circuit identifies portions of the writing in a plurality of images captured by the camera to enable creating a single image based upon the plurality of images; and a transmitter circuit configured to transmit at least one of the plurality of images or the signal images based upon the plurality of images to another electronic device.

A method of implementing an electronic device adapted to apply information to a surface is also described. The method comprises providing a writing element adapted to apply a writing to the surface; detecting the writing applied to the surface using a detection circuit; detecting a motion of the electronic device with respect to the surface; identifying portions of the writing in a plurality of images captured by the detection circuit; and creating a single image based upon the plurality of images; wherein the writing applied to the surface is detected without the use of identification markers on the surface.

BRIEF DESCRIPTION OF THE DRAWINGS

FIG. 6-1, FIG. 6-2, FIG. 6-3, and FIG. 6-4 are a series of diagrams showing the formation of the letter "J" using the writing element of FIGS. 4 and 5;

FIG. 8-1, FIG. 8-2, FIG. 8-3 and FIG. 8-4 are a series of diagrams showing the formation of the letter "J" using the writing element of FIG. 7;

DETAILED DESCRIPTION

Figure 1:
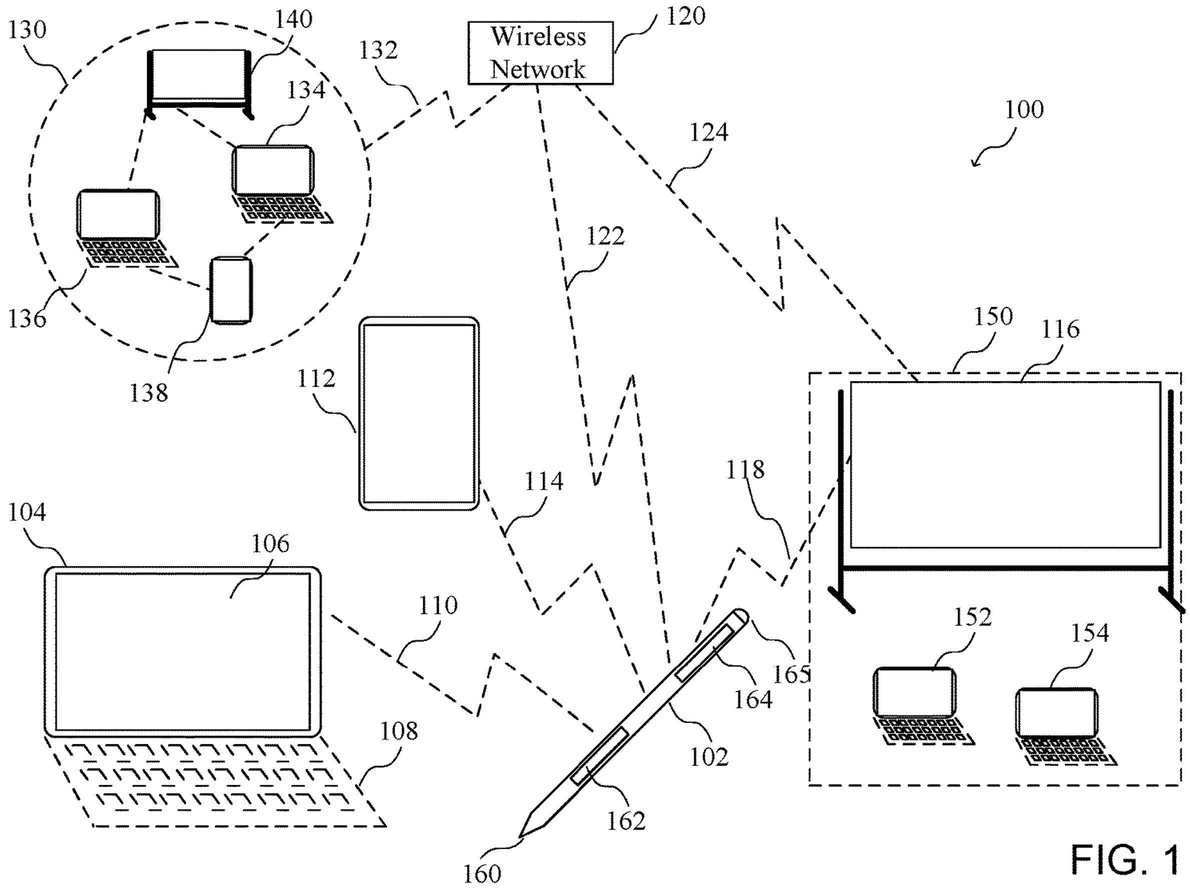
FIG. 1 is a block diagram of a system for implementing a smart pen.

An electronic device adapted to apply information to a surface is described. The electronic device comprising a writing element; and a detection circuit adapted to detect the information; wherein the detection circuit, such as a camera, identifies portions of the information. Systems and methods of implementing an electronic device, such as a smart pen are also described. The electronic device, systems and methods enable collaboration with user of other devices, locally or at remote location. The electronic devices, systems and methods also enable the conversion of documents to various different formats, and where at least some of the formats are automatically annotated The smart pens, systems, and methods of implementing a smart pen provide less restrictive techniques of entering text, and improved techniques of communicating text and collaborating with other people who may have access to a document to enter information for the document. According to some implementations, a writing element, such as a ball pen type of writing element, any type of pencil or other device for applying a writing to a surface, such as a dry erase marker, can be used, where the movement of the ball of the writing element and/or the movement of the pen with respect to one or more marking on the pen can be used to create an electronic record associated with the text or other objects created by the pen. In the case of written text, the text can be recorded in an American Standard Code for Information Interchange (ASCII) format for example through object character recognition (OCR). While smart pen is used by way of example as a type of device having a writing element and an electronic circuit used to enable identifying writing created by the writing element, the circuit and methods set forth below could apply to any electronic device having a writing element. That is, while circuits and methods below are described in reference to a smart pen, it should be understood that the circuits and methods could be used with any type of writing element, such as a pencil or dry-erase ink based writing element. While a variety of circuit elements are provided for detecting the creation of a writing, it should be understood that the various circuit elements could be used alone or in combination to detect the creation of a writing. That is, while multiple circuit elements are provided in a single embodiment, it should be understood that any one of the circuit elements could be implemented in an electronic device, or used in the electronic device for detecting the creation of the writing.

While the specification includes claims defining the features of one or more implementations of the invention that are regarded as novel, it is believed that the circuits and methods will be better understood from a consideration of the description in conjunction with the drawings. While various circuits and methods are disclosed, it is to be understood that the circuits and methods are merely exemplary of the inventive arrangements, which can be embodied in various forms. Therefore, specific structural and functional details disclosed within this specification are not to be interpreted as limiting, but merely as a basis for the claims and as a representative basis for teaching one skilled in the art to variously employ the inventive arrangements in virtually any appropriately detailed structure. Further, the terms and phrases used herein are not intended to be limiting, but rather to provide an understandable description of the circuits and methods.

Turning first to FIG. 1, a block diagram of a system 100 for implementing an electronic device, shown here by way of example as a smart pen, is shown. The system of FIG. 1 comprises various elements that communicate with a smart pen, including various wireless communication links between the various elements. An electronic device 102 having a writing element, is adapted to communication, such as by way one or more wireless communication links, with a variety of other devices, locally or remotely. More particularly, a portable electronic device 104, which may be a laptop computer or a tablet, comprises a display 106 and a keypad 108, show here in dashed lines by way of example as a detachable keypad. The portable electronic device 104 may be communicate with the electronic device 102 by way of a communication link, which may be a wireless communication link 110. While a portable electronic device is shown, it should be understood that the electronic device 104 could be a fixed electronic device, such as a desktop computer. Another portable electronic device 112, which may be a mobile communication device (e.g. a mobile telephone), can communicate with the electronic device 102 by way of a communication link 114. The communication links 112 and 114 could be a part of the same communication link, such as a local wireless network (e.g. a WiFi network), or may be separate connections, such as individual short-range connections, including short range wireless connections (e.g. Bluetooth or NFC). The electronic device could also communicate with a collaboration device 116, which may be an electronic white board or a display accessible by one or more other users, by way a local communication link 118, which may be a wireless communication link for example, The system 100 may also comprise a wireless network 120, which may be a local network (e.g. WiFi) or a wide area network (e.g. a cellular network). Rather than or in addition to the communication device 102 communicating with the collaboration device 116 by way of the local communication link 118, the communication device 102 may communicate with the collaboration device 116 using the wireless network 120 by way of communication links 122 and 124 associated with the wireless network 120. That is, is addition to communicating with the collaboration device 116 by way of a local connection, which may be a direct connection (e.g. Bluetooth) or a local network (WiFi), the collaboration device 116 may be in communication with the collaboration device 116 by way of a wide area wireless network 120, which may be a cellular telephone network for example.

The system may also comprise remote collaboration groups, where the user may collaborate with other users of the collaboration group. For example, the electronic device 102 may communicate with a first collaboration group 130 by way of a communication link 132, and more particularly communicate with any of the elements of the first collaboration group 130 including electronic devices 134 and 136, which may be laptops or tablets for example, and a portable electronic device 138, which may be a mobile telephone for example, are adapted to communicate with another collaboration device 140. The electronic device 102 may also collaborate a second collaboration group 150, comprising the collaboration device 116 as described above, and other elements of the elements of the collaboration group 150, such as electronic devices 152 and 154, by way of the communication link 124 or some other communication link, which may be a local communication link. As will be described in more detail below, the smart pen can collaborate with at least one of another smart pen or other elements of the system to share documents or contribute to a single document, including information generated by a writing element 160.

Figure 2:
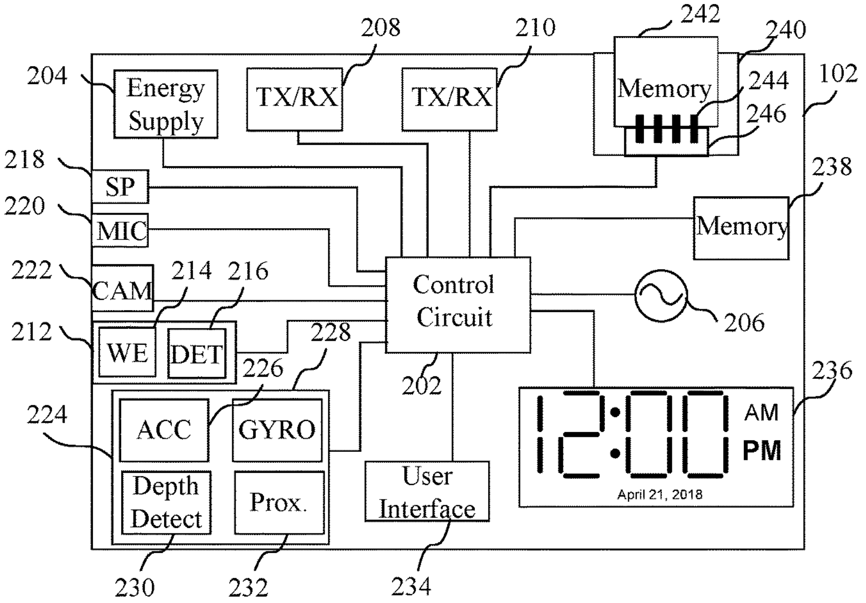
FIG. 2 is a block diagram of a circuit for implementing a smart pen.

Turning now to FIG. 2, a block diagram of a circuit for implementing a smart pen is shown. The circuit of FIG. 2 comprises circuit elements that enable the communication of information with other elements, such as elements of the system of FIG. 1, or the collaboration on or contribution to a document with other elements of the system, as will be described in more detail below. The electronic device 102 comprises a control circuit 202, which may be a processor for example. The control circuit 202 is in communication, directly or indirectly, with a variety of elements that enable the operation of the electronic device, and particularly the tracking of the writing of text or drawings, as well as the collaboration with others on a document. An energy supply 204, which may be a battery for example, and an oscillator 206 enable the electronic device 102 to provide the functionality of a smart pen and communicate with other electronic devices. The electronic device 102 also comprises transceivers, which may be wireless transceivers, including transceivers 208 and 210. The transceivers could enable wireless communication of data with another device. According to some implementations, the transceivers could comprise local (short range) wireless connections such as Bluetooth, NFC or WiFi, or wider area coverage, such as a cellular connection. While 2 transceivers are shown by way of example, it should be understood that any number of transceivers could be used to implement any type of communication protocol, wired or wireless. While transceivers, which comprise a transmitter circuit and a receiver circuit, are shown, it should be understood that individual transmitter circuits and receiver circuits could be implemented. According to one embodiment, the transfer of data is one direction, and only a transmitter circuit may be used. The electronic device 102 also comprises a detection element 212, including a writing element 214 (such as a ball point pen device) and a detector 216 for detecting text or other writings generated by the writing element on the paper. The detection element 214 could be a camera or other recording element that is adapted to scan text or other writings on the paper. As will be described in more detail below, the detection element 214 may be adapted to determine the relative relationship between text or other writings on the paper. While paper with location markings providing the relative relationship between the text and other writings, the detection element may be adapted to enable the electronic device to create a replica of the text and other writings in an electronic format (i.e. saved as an electronic file). That is, the detection element determines the relative location of text and other writings, with respect to one another, to create a facsimile copy of the actual writings that was created by the writing element.

Other elements of the electronic device are used to receive inputs (e.g. audio or visual inputs) and generate outputs (e.g. audio or information provided on a display). For example, the electronic device 102 could comprise a speaker 218, a microphone 220, and a camera 222. According to one implementation, the camera 222 could enable video conferencing, or could provide information to supplement information identified by the detector 216 of the detection element 212.

The electronic device may further comprise sensor elements. More particularly, a sensor block 234 comprises one or more sensors, including by way of example an accelerometer 226, a gyroscope 228, a depth detector 230, and a proximity sensor 232. While particular sensors are shown, it should be understood that any other type of sensor for enabling the operation of a smart pen, including the detection of writings, could be used.

A user interface 234 and a display 236 may also be provided. The user interface 234 may comprise keys or other actuators associated with data entry, and may be used in conjunction with other elements of the electronic device, such as the speaker or microphone, as will be described in more detail below. Example actuators will be described in reference to FIG. 3. The user interface may also include electrical connectors for receiving information from an external device, or providing information to an external device. The display may display a variety of information, including information related to the status or operation of the electronic device, or information received from an external source, such as one or more other electronic devices.

Memory may also be provided, including one or both of a fixed memory, and a removeable memory. For example, an internal memory 238 may be included in addition to or in place of a portable memory 240 inserted in a connector 242, where contact elements of 244 of the portable memory 240 may be electrically coupled to corresponding contact elements 246 of the connector. The portable memory 240 could be used to store data or transfer data to or from the electronic device.

Figure 3:
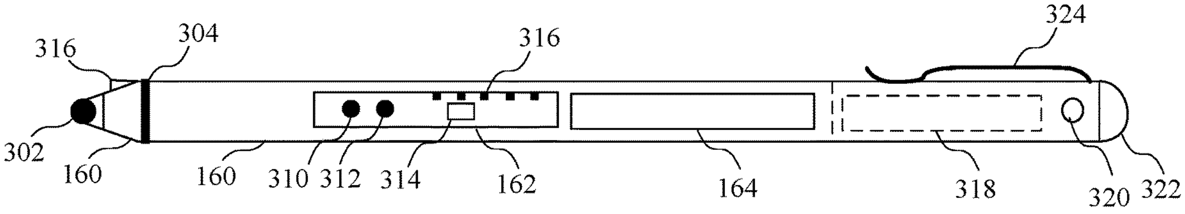
FIG. 3 is a diagram showing a user interface and other elements of a smart pen.

Turning now to FIG. 3, a diagram shows user interface and other elements of a smart pen. The user interface may comprise input elements for enabling a user of the smart pen to input information (microphone, keypad, a writing element (e.g. a pen element for applying ink to a paper)), output elements (e.g. display, speaker, tactile feedback, etc.), and function or mode actuators, for example. The electronic device 102 comprises a ball 302 of a ball pen for applying ink to a paper, as well as a detector 304, which may be a ring detector for example, for detecting when pressure is being applied to the ball pen, and the pen is being used. While a description is provided for the of a rolling ball structure for providing ink (i.e. liquid) to paper, it should be understood that other types of writing elements could be employed, such as carbon materials (e.g. a "lead" pencil) or some other solid material, or a liquid material such as fluid used for a highlighter or a dry erase board.

An exemplary user interface 162 is also shown having various actuators, including button actuators 310 and 312 and a sliding actuator 314 that is movable between various positions designated by indicators 316. According to one implementation, the sliding actuator 314 could be used to select a mode of operation of the electronic device, and the buttons 310 and 312 could be used for cursoring through menu options and selecting an option, which may be shown on the display 164. According to other implementations, a top portion (i.e. a cap as indicated by the dashed line) of the electronic device may be twisted to cursor through menu options and pressed (for example inward toward the writing element) along the long axis of the electronic device to select an option. An energy source 318, such as a rechargeable battery (shown in dashed lines to indicate that it is internal to the electronic device), may be implemented to enable wireless operation of the electronic device. A connector 320 may also be included to enable providing data to or receiving data from an external source by way of a wireless connection, in addition to any wireless communication circuit that may be implemented as described above. A stylus end 322 can also be implemented to enable use of the electronic device with a touch screen interface. A pocket clip 324 can also be provided to securing the electronic device, such as in a pocket of the user. While examples of interface elements are provided, it should be understood that different or additional user interface elements could be used.

Figure 4:
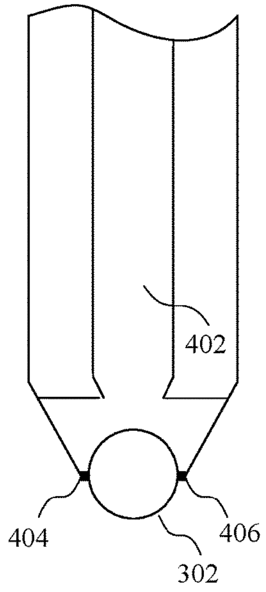
FIG. 4 is a cross-sectional view showing a writing element at an end of a smart pen.

Turning now to FIG. 4, a diagram shows a writing element of a smart pen, such as a ball point writing element. More particularly, a cross-sectional view of a writing implement comprises a ball that is movable to apply an ink contained in the smart pen. As will be described in more detail below, the movement of the ball of the writing element can be tracked to determine the information created by a writing on a sheet of paper, for example, such as a letter of text or a portion of an image. More particularly, an ink channel 402 enables the flow of ink to the ball 302. Retaining elements 404 and 406 retain the ball 302 to enable the ball to roll and dispense ink. As will be described in more detail below, detection elements may be implemented to track the movement of the ball and help identify text or other writings.

Figure 5:
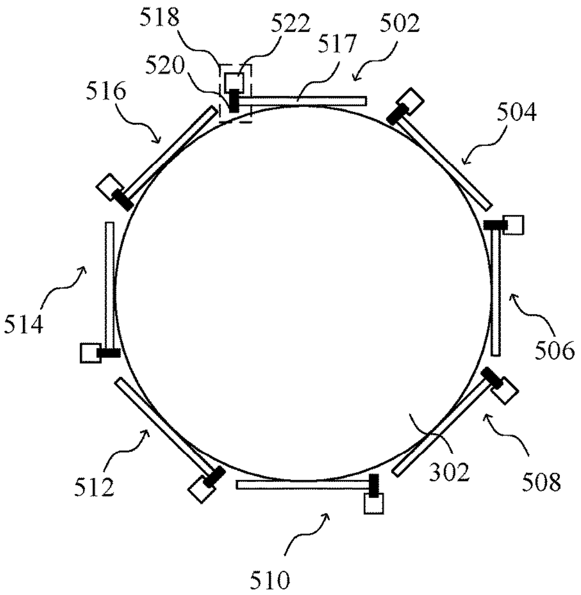
FIG. 5 is a top plan view of the exemplary implementation of a writing element of FIG. 4.

Turning now to FIG. 5, a diagram of an implementation of a writing element of a smart pen is shown. The exemplary writing element of FIG. 5 may comprise a plurality of motion detectors distributed around a portion of the ball, such as around a perimeter (i.e. a circumference) of the ball. According to some implementations, the motion detectors may comprise a cylinder (e.g. a rotatable shaft) having a disk at the end of and perpendicular to the cylinder. The motion of the disk, and therefore a component of the motion of the ball, can be determined by the amount of rotation of the disk. As shown by way of example in FIG. 5, a plurality of detection elements 502-516 are distributed around the ball 302, enabling the generation of a time-based directional vector describing the movement of the ball, and therefore the formation of writing on the paper, during periodic time frames. According to one implementation, each detection element comprises a shaft 517 that coupled to a detector 518 that detects a rotation of the shaft 517 (i.e. in response to the movement of the ball 302 during writing). The detector may comprise a disk 520, the rotation of which can be detected by a detector receiver 522. The detection of the rotation of the disk can be by any means, such as mechanical, optical, and magnetic for example. By symmetrically dispersing the detection elements, a motion vector can be generated based upon component vectors generated by the detection elements. While 8 detectors are shown by way of example, and number of detectors could be used, where a minimum of 2 detectors could be implemented to provide an X and Y component to estimate the movement of the ball while applying the ink to the paper. For example, more than 2 circuit elements may be used to compensate for movement of the ball within the retaining elements 404 and 406 (to enable the ball to move and apply ink) that may cause only some of the detection elements to detect movement of the ball.

Figures 1, 6:
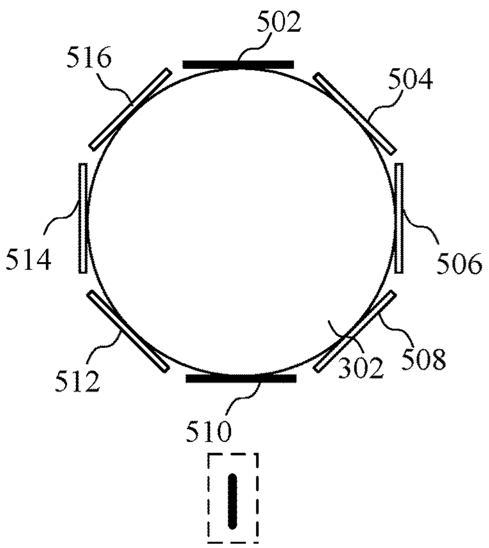
Figures 2, 6:
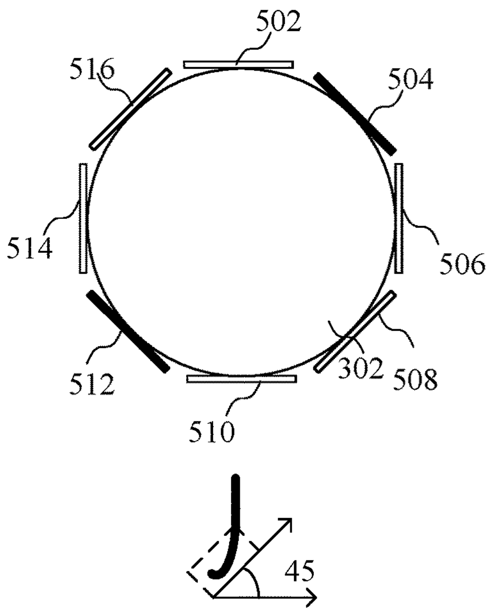
Figures 3, 6:
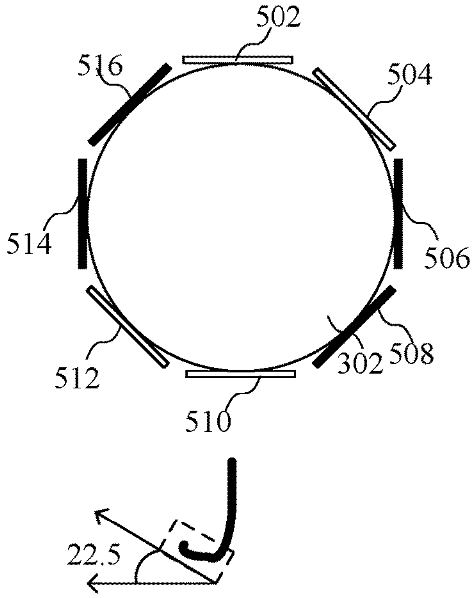
Figures 4, 6:
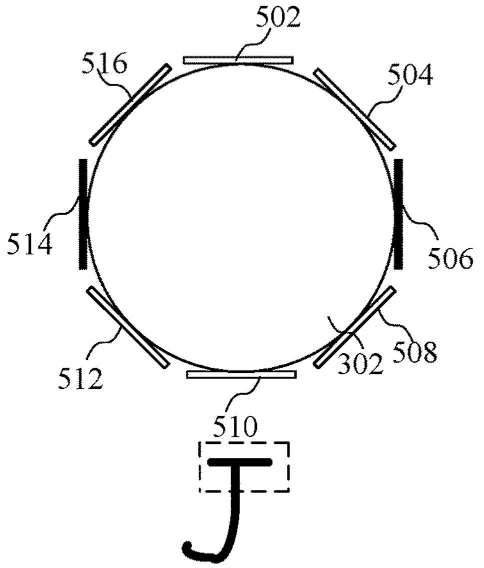

Turning now to FIG. 6 is a series of diagrams shows the formation of the letter "J" using the writing element of FIG. 5. As can be seen in FIG. 6, cylinders that are moved during the formation of a portion of the letter J are shown in black. For example, FIG. 6-1 shows detection of the movement of the ball to form the top portion of the J using detection elements 502 and 508. The second portion of the J may be detected by the detection elements 504 and 510. In the portion detected as shown in FIG. 6-3, 4 detection elements 506, 508, 514, 516 detect movement of the ball. In FIG. 6-4, motion detectors 506 and 514 are used to detect the formation of the line across the top of the J. The resolution of the detected writing can be affected by the frequency of the detection of movements of the ball. According to some implementations, the detected motion of the cylinders is used, at least in part, to determine information formed by the ball of the writing element on the paper. That is, the detected motion of the ball could be used in combination with other detectors, such as cameras, as will be described in more detail below.

Figure 7:
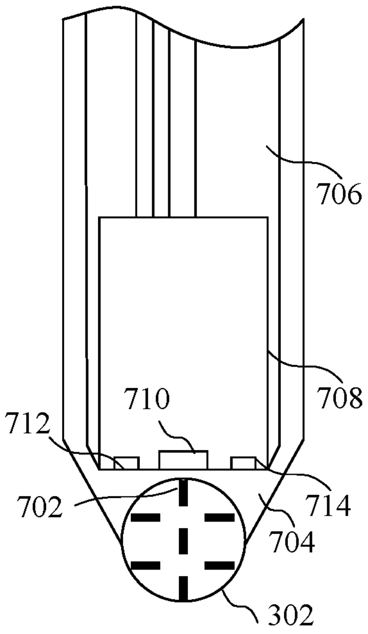
FIG. 7 is a cross-sectional view of another exemplary implementation of a writing element of a smart pen.

Turning now to 7, a diagram of another implementation of a writing element of a smart pen is shown. The exemplary configuration of FIG. 7 shows the detection of the motion of the ball by tracking one or more markers on the ball. By way of example, the markers could be lines printed on or protruding from the surface of the ball, where the motion of the markers could be used to determine the motion of the ball. More particularly, the ball 302 comprises a plurality of distributed markers 702. While the markers are shown here as lines, the could be t-shaped markers, crosses, squares, triangles, or any other shape that helps track the motion of the ball while the electronic device is used for writing. The electronic device of FIG. 7 comprises a well 704 for holding ink to be applied to the paper. An inner chamber 602 is adapted to receive a detection element 708. According to one implementation, the detection element may comprises a detector for detecting motion of the ball 302 based upon changes of a signal generated by the one or more signal generators, shown here by way of example as signals generators 712 and 714. The signal generators could generate light signals for example, where the light detected be detector 710 could change based upon motion of the markers 702. However, the detector 708 could comprise any type of transmitter/receiver pair for detecting a change of a transmitted signal, such as an audio signal, infrared (IR) signal, or any other signal frequency. While the detection element is shown in the inner chamber 706, it should be understood that the inner chamber could be eliminated, where detection element 708 the inserted into directly into the ink.

Figures 1, 8:
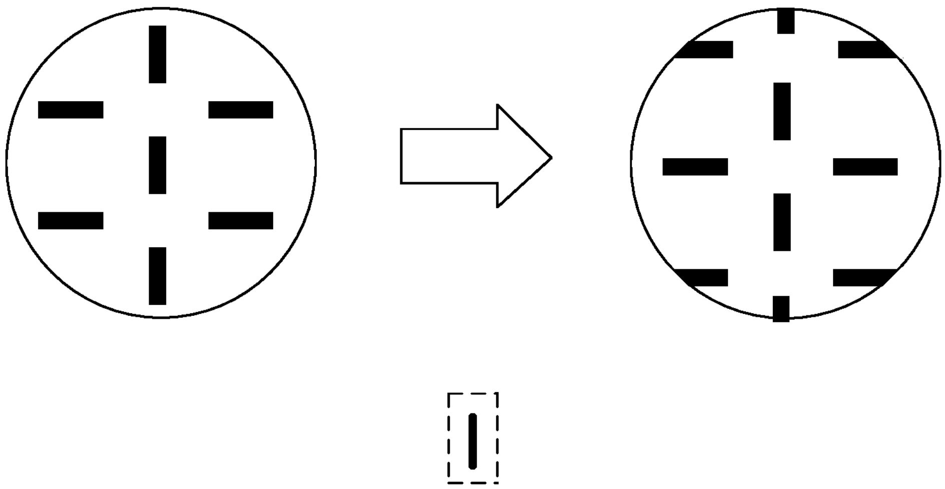
Figures 2, 8:
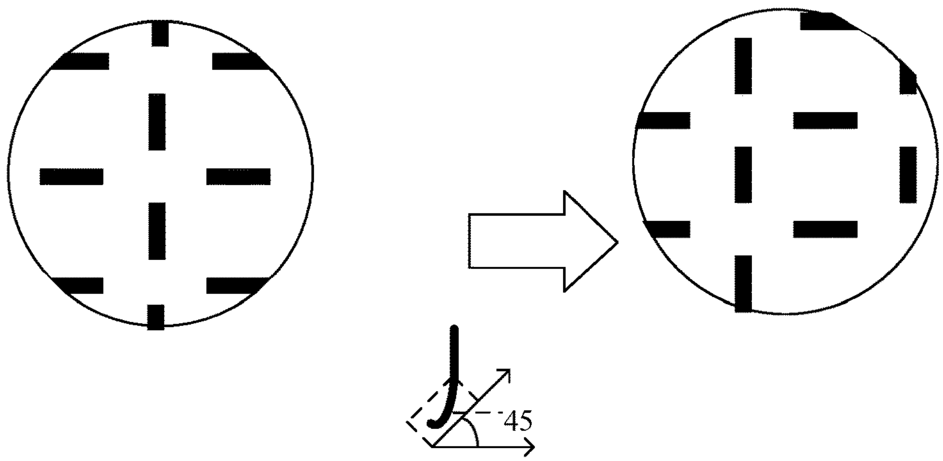
Figures 3, 8:
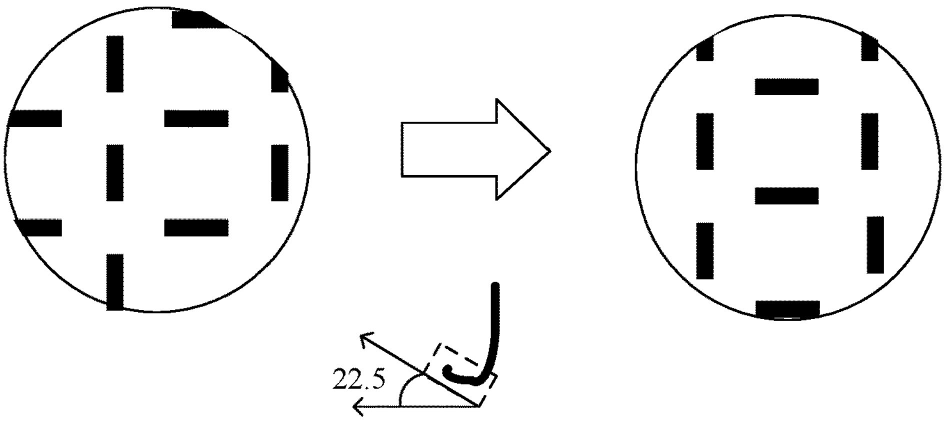
Figures 4, 8:
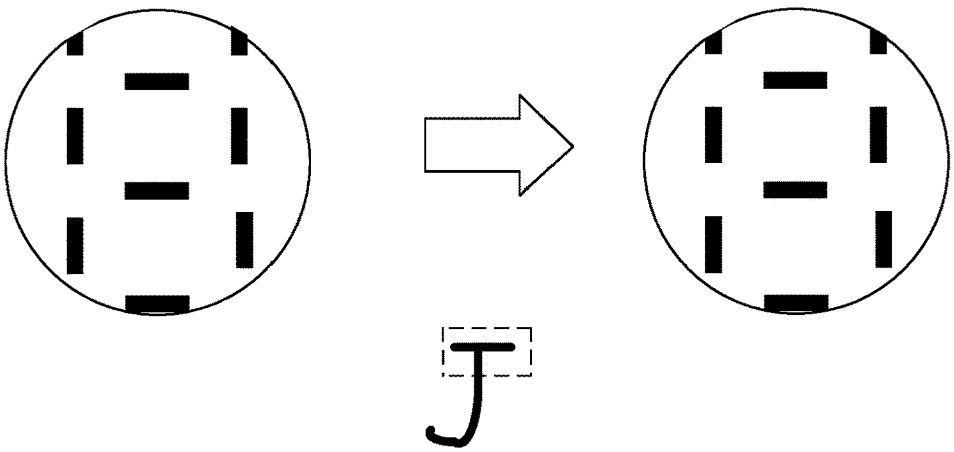

Turning now to 8, a series of diagrams show the formation of the letter "J" using the writing element of FIG. 7. As shown in FIG. 8-1, the horizontal markers are shown as moving, where the direction of the movement of the markers can be detected over time. Similarly, as shown in FIG. 8-2, the motion of both the horizontal and vertical markers indicates the motion of the ball to form an additional portion of the letter J, such as a motion at approximately 45 degrees down and to the left. FIG. 8-3 shows the motion of the ball up and to the right. Finally, FIG. 8-4 shows the motion of vertical and horizontal markers to the left. As described above in reference to FIG. 7, the motion of the ball, which is determined here by the motion of the markers, can be used to identify the formation of information including writings, such as text or images, on the paper.

Figure 9:
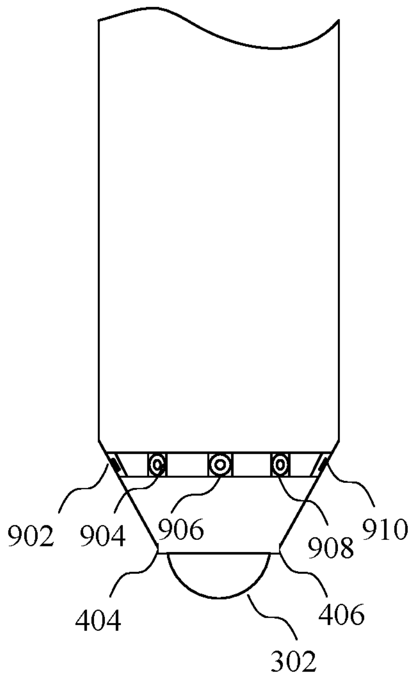
FIG. 9 is a diagram showing a smart pen having a plurality of cameras.

Turning now to FIG. 9 is a diagram showing an electronic device comprising a smart pen having a plurality of cameras. The smart pen of FIG. 9 comprises a plurality of cameras 902-910, shown here by way of example as encircling the writing element 406. According to the example of FIG. 9, the cameras are evenly distributed, 5 of 8 cameras 902-910 are visible in the side view of the smart pen. While an implementation of a smart pen having 8 cameras is shown, it should be understood that any number of cameras could be used. Further, it should be understood that the cameras could be used alone, or in conjunction with detection elements used to detect the motion of the ball to detect the formation of a writing as described above. Under some circumstances, certain detection elements may provide better information related to the movement of the smart pen and the formation of the writing. For example, it may be that the some of the camera are covered by the user's fingers or thumb, preventing the detection of the writing by the cameras. Therefore, the smart pen may rely upon one or more other detection elements, such as detection elements for detection the motion of the ball as it is moving or the detection of the motion of the pen itself using a motion detector circuit, such as an accelerometer or inertial measurement unit (IMU). According to some embodiments, the data generated by the various detectors can be periodically or continuously monitored to determine the best data to use to detect the formation of the writing. Certain detection elements may be placed in standby to reduce power if it is determined that a most reliable detection element, such as the plurality of cameras, is providing reliable information.

Figure 10:
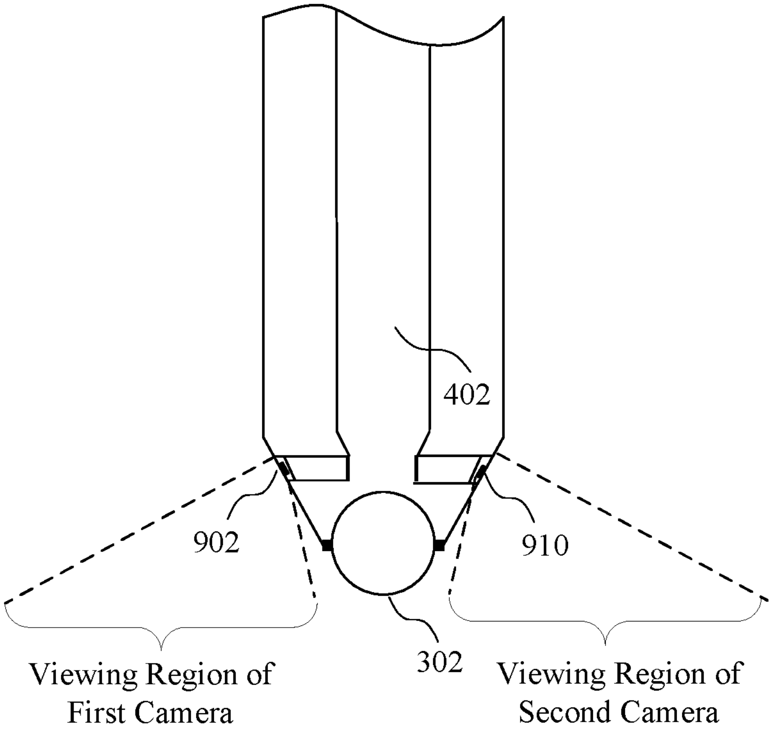
FIG. 10 is a cross-sectional view of the smart pen of FIG. 9 showing a camera viewing area of two of the cameras.

Turning now to FIG. 10, a cross-sectional view of the smart pen of FIG. 9 showing a camera viewing area of two of the cameras is shown. As shown in FIG. 10, a first viewing region of a first camera 902 and a second viewing region of a second camera 910 enable capturing writing generated by the ball 302. While the viewing regions are shown by way of example, it should be understood that wider or narrower viewing regions could be used depending upon different factors, such as the resolution of the camera, the desired resolution of the captured images, settings set by a user, etc. According to some implementations, the cameras may be configured to focus at different heights off the paper. For example, some cameras may be used to detect writings when the ball of the pen is in contact with the paper, while other cameras may be configured to detect writings when the pen is raised off the paper by a predetermined height, which may be an average height that users of the smart pen may lift the smart pen of off the paper while writing. The smart pen may adjust the focus of the cameras over time according to the operation of the user to more closely correspond to the actual use by a particular user. According to other implementations, the smart pen may turn off some of the cameras for power reduction. For example, if a user of the smart pen is writing from left to right, the smart pen may turn off cameras detecting writings above and below the writings because those cameras are not detecting writings and are therefore wasting power.

Figure 11:
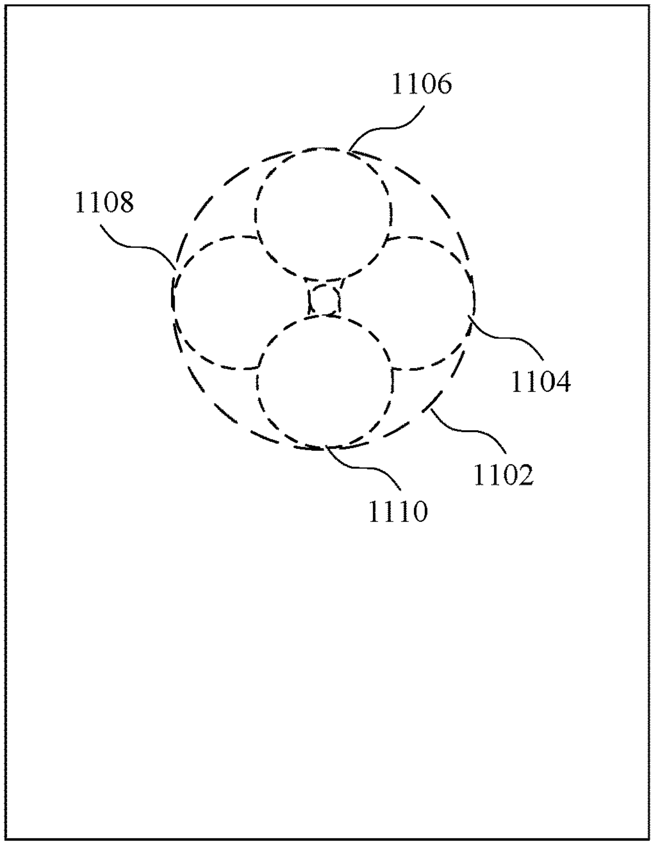
FIG. 11 is a diagram showing a top plan view of a composite viewing area of a smart pen having 4 cameras.
Figure 12:
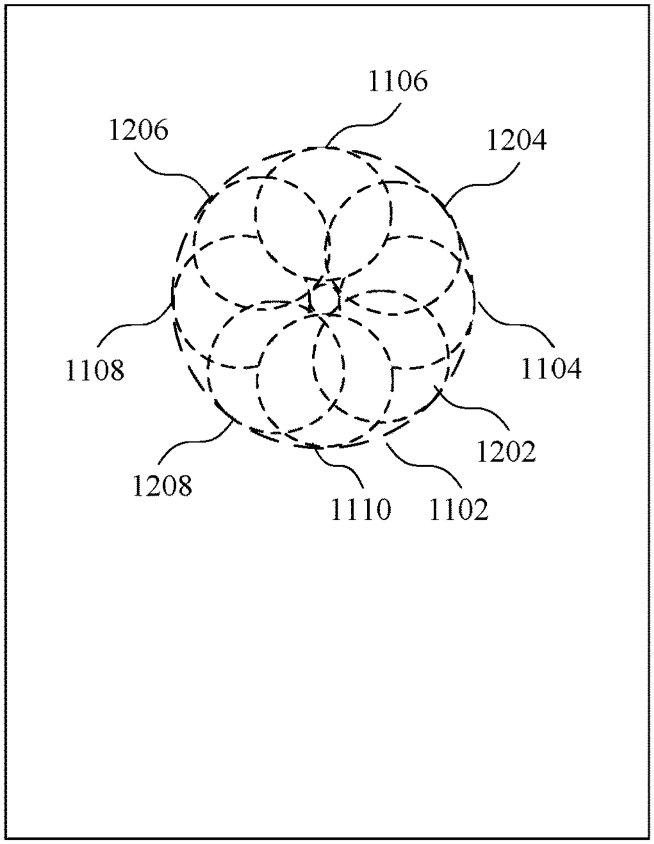
FIG. 12 is a diagram showing a top plan view of a composite viewing area of a smart pen having 8 cameras.

Turning now to FIG. 11, a diagram shows a top plan view of a composite viewing area of a smart pen having 4 cameras. In particular, a "composite" viewing area 1102 has first through fourth viewing areas 1104-1110. While not all of the composite viewing area would be visible by the four cameras, a greater percentage of the composite viewing area would include data, including data of viewing areas 1202-1208 captured by the 4 additional cameras. The viewing areas are shown by way of example as circles, but could be other shapes depending upon the configuration of the cameras. The viewing areas are shown by way of example as circles to show how the cameras provide reliable image data associated with writings for different areas.

Figure 13:
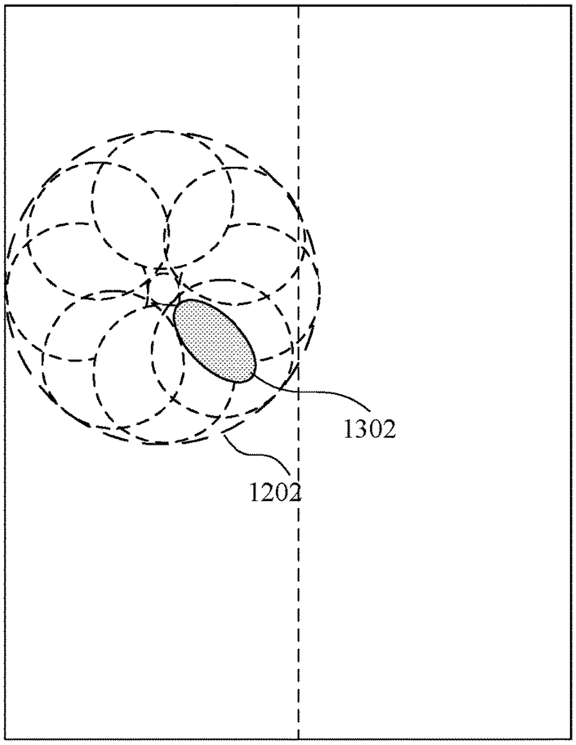
FIG. 13 is a diagram showing a composite viewing area extending at least one of the width of a piece of paper.

Turning now to FIG. 13, a diagram shows a composite viewing area extending at least one of the width of a piece of paper. As shown in FIG. 13, the composite viewing area 1202 extends for more than half of the width of the paper (e.g. 4.5 inches which would be more than half of a piece of paper that is 8.5 inches). A blocked region 1302, shown by region 1302, represents a region where a finger or thumb may block the camera. However, as the user of the smart pen continues to write, the smart pen may be rotated or the user of the smart pen may hold the pen differently, enabling the region 1302 to be captured over time. However, data from other sensors or additional data from other images, also known as frame, may be used to determined information associated with the writing in the region 1302 when a camera normally able to detect a writing may be covered.

Figure 14:
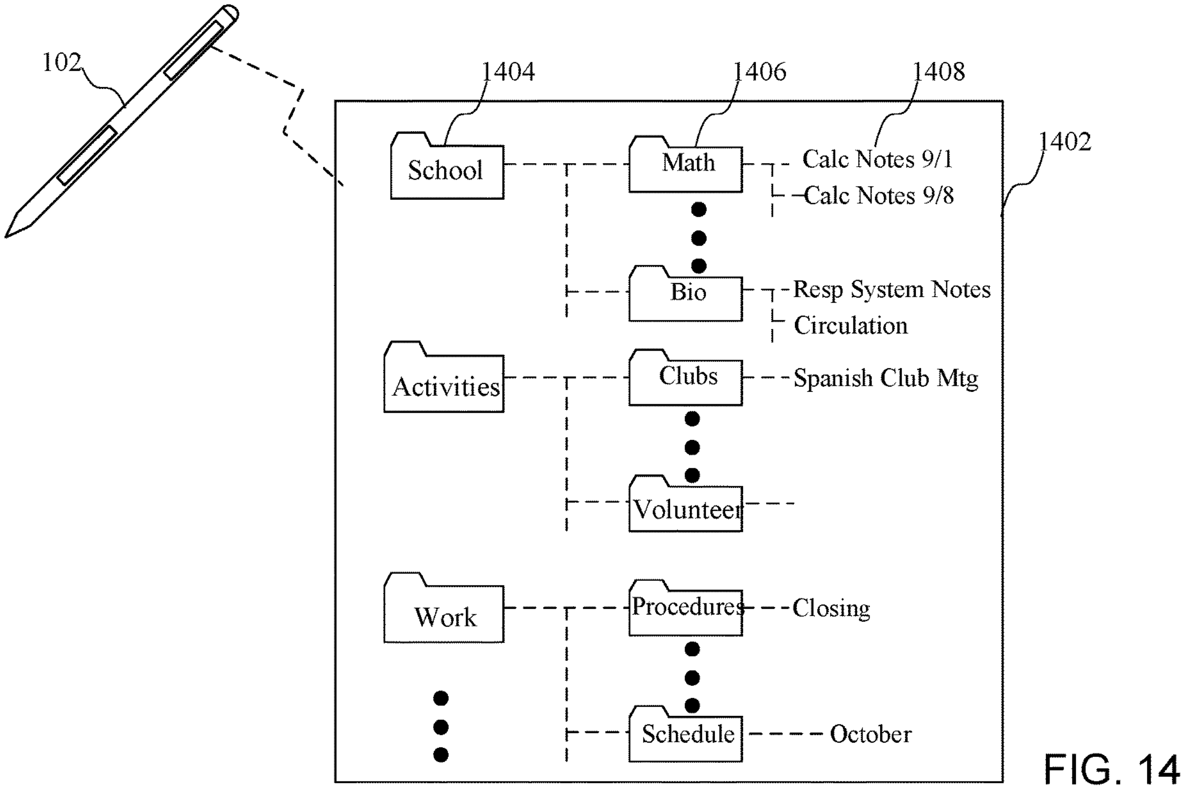
FIG. 14 is a diagram showing a folder and document arrangement generated by a smart pen.

Turning now to FIG. 14, a diagram shows a folder and document arrangement generated by a smart pen. According to one implementation, the device 102 may automatically create a document filing system 1402. The document filing system 1402 may include folders 1402, sub-folders 1404 and documents 1408 what may be filed in a folder or sub-folder. The device 102 can create the folders, sub-folders and documents by analyzing the text and determining where a document, or even a portion of a document should be placed. The documents could be saved on the smart pen, another device of the user, the cloud, or any combination of those elements or other elements.

Figure 15:
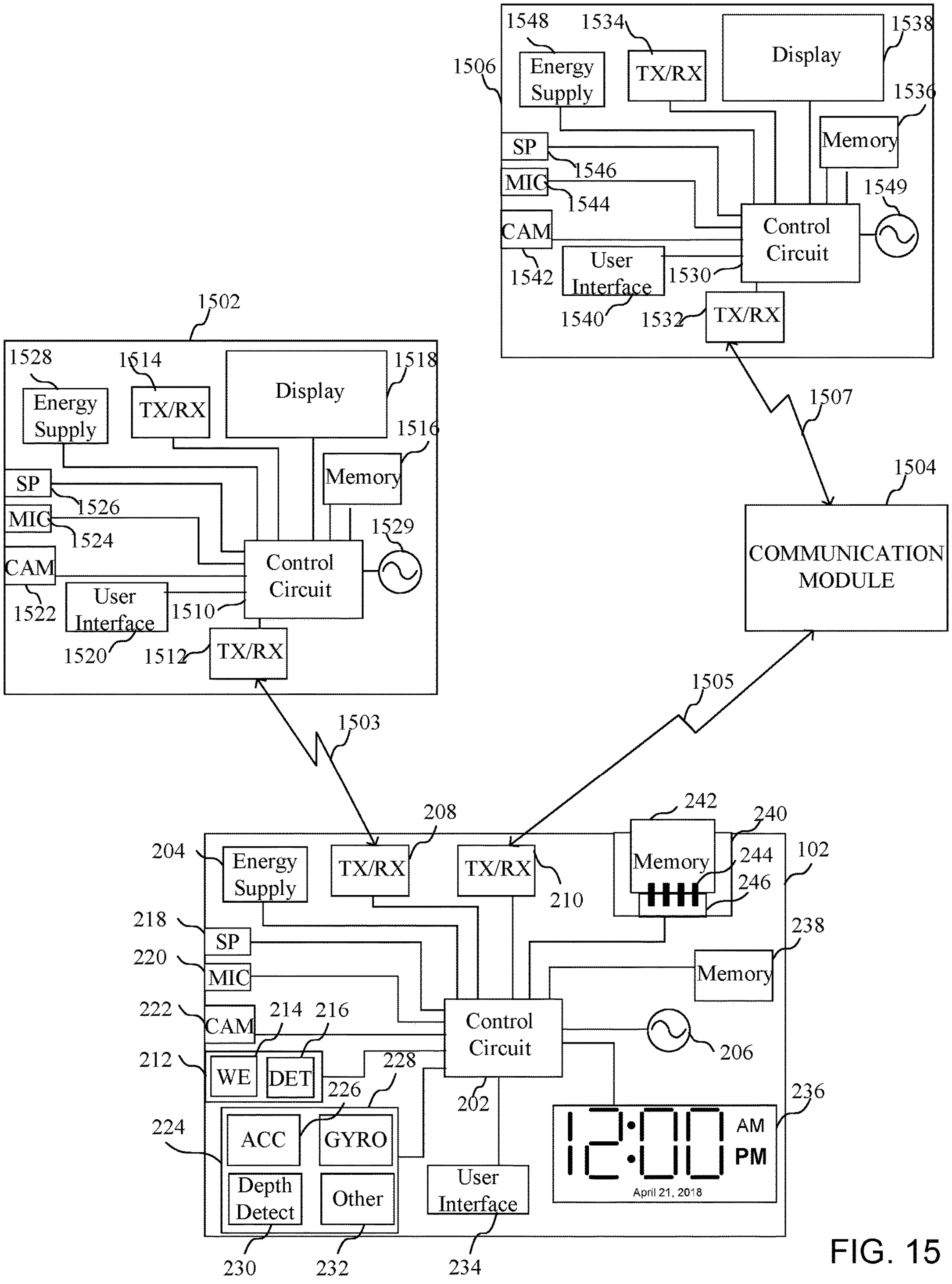
FIG. 15 is a block diagram of a system for implementing a smart pen.

Turning now to FIG. 15, a block diagram of a system for implementing a smart pen is shown. The system of FIG. 15 comprises various electronic devices adapted to communication with the smart pen by way of one or more communication means, such as a wireless communication means. According to the implementation of FIG. 15, the electronic device 102 is adapted to communicate with a plurality of devices in the system, including a device 1502 by way of a communication link 1503, and other devices by way of a communication module 1504. More particularly, the electronic device 102 communicates with the modem 1504 by way of a communication link 1505 and with another electronic device 1506 by way of communication link 1507 between the electronic device 1506 and the module 1504, which may be a WiFi base for example.

The electronic device 1502 may comprise a variety of elements for generating and communicating information with the electronic device 102. The electronic device 1502 may comprise a control circuit 1510, a transceiver 1512 (which is shown in communication with the electronic device 102 by way of the communication link 1503), and another transceiver 1514. The electronic device 1502 also comprises a variety of input and output elements, such as a memory 1516, a display 1518, a user interface 1520, a camera 1522, a microphone, 1524 and a speaker 1526. An energy supply 1528 and an oscillator 1529 could also be implemented to enable operation of the electronic device. It should be understood that the input and output elements could be implemented as described above in reference to FIG. 2. While particular elements of the electronic device are shown by way of example, it should be understood that other elements could also be implemented. According to one implementation, the electronic device 1502 could be a laptop computer, a tablet computer, a mobile telephone, or other fixed or mobile computer device.

The electronic device 1506 may also comprise a variety of elements for generating and communicating information with the electronic device 102 by way of the modem 1504. The electronic device 1506 may comprises a control circuit 1530, a transceiver 1532 (which is shown in communication with the electronic device 102 by way of the communication link 1503), and another transceiver 1534. The electronic device 1502 also comprises a variety of input and output elements, such as a memory 1536, a display 1538, a user interface 1540, a camera 1542, a microphone, 1544 and a speaker 1546. An energy supply 1548 and an oscillator 1549 could also be implemented to enable operation of the electronic device. The electronic device 1506 could also be a laptop computer, a tablet computer, a mobile telephone, or other fixed or mobile computer device.

Figure 16:
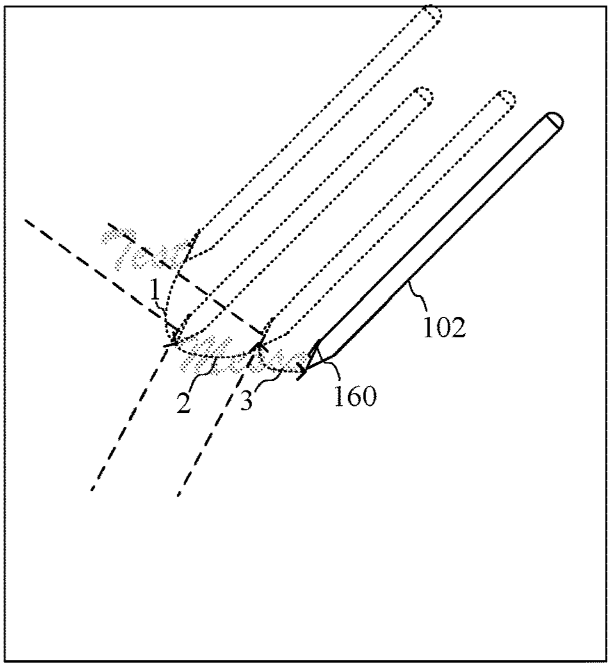
FIG. 16 is a diagram showing the use of an imaging element for tracking the movement of a smart pen and the formation letters.
Figure 17:
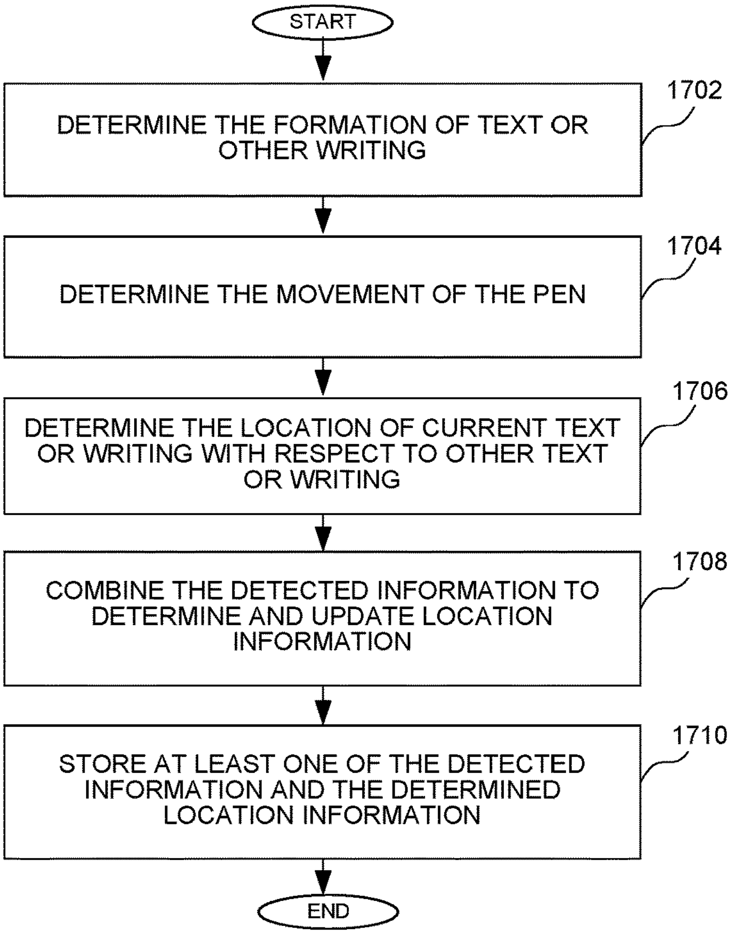
FIG. 17 is a flow diagram showing a method of tracking of text formed by a smart pen.

Turning now to 16, a diagram showing the use of an imaging element for tracking the movement of a smart pen and the formation letters is shown. That is, the movement of the writing element of FIG. 16 is tracked by a tracking device, such as a camera, of the writing element. As shown in FIG. 16, the writing element 160 of the electronic device 102 can be moved to create a writing, such as text or objects in a drawing, where the lines associated with the text or the objects. After writing the work "Test," the pen is moved in a first motion (designated as "1") to start the writing of the word "Message." As can be seen by the dashed lines representing the view angle of a camera of the writing element 160, no lines of the word "Test" can be seen by the camera. However, after the electronic device continues to write the word "Message," as shown by way of example after a second motion (designated as "2"), at least a portion of the word "Test" can be seen by the camera of the electronic device. As the electronic device 102 continues to move to finish the word "Message" as a part of a third motion designated as "3," more or all of the word "Test" will be visible. During the writing of the word "Test," all of the lines of the word should be visible to the camera. When the lines of the word "Message" are created, the size and relative position of the lines with respect to the lines are the word "Test" is determined, enabling the electronic device to create an electronic representation of the words based upon the capture of images associated with the individual words. It should be noted that by using a camera to continuously capture writing by the electronic device, and identify elements of the writing a first portion of the writing (e.g. the word "Test") while also writing a second portion of the writing (e.g. "Message"), it is possible to create an electronic representation of the writing that is a facsimile of the original writing created on the paper with a need for markers on the paper (that provide a location or frame of reference for the writing) or a device external to the smart pen to record the image. While some or all of the processing of the images to create a composite image may be performed remotely from the smart pen, no devices are needed for the smart pen to capture the images necessary create a composite image.

The electronic device 102 is also adapted to provide a frame of reference for writing with respect to the paper. For example, any writing can be placed on the paper at an appropriate location with respect to the sides of the paper. While capturing the formation of a word or object, such as the word "Test," it is likely that the camera will capture the edge of the paper. That is, when creating words while writing left to right along the paper, it is most likely that the user of the electronic device will position the pen at a location that will enable the camera to see the end of the paper. If the camera does not see the end of the paper, it can zoom out to see the end of the paper. For the vertical direction, if the camera does not see the top or bottom of the paper, and is not able to zoom out to see the top or bottom, the drawing can be placed at a default location in the vertical direction, such as centered in the vertical direction or where the text or drawing is positioned at predetermined location from the top of the paper. While the use of the camera on the electronic device eliminates the need for any markers on the paper (and therefore eliminates the use of special paper that may have markings, visible to a user or invisible to a user by detectable by a camera for example), markings on a paper can be used to supplement the data that is captured and analyzed to create a facsimile of text or drawings that are created on a paper. For example, if a user of the electronic device used lined paper or graph paper for example, the horizontal lines of the lined paper or horizontal and vertical lines of the graph paper can be used provide additional information related to the size and location of text or drawings, and the relative location of text or other drawings with respect to one another. While a camera is shown, it should be understood that multiple cameras could be used as described above, and that the camera could be used in conjunction with other elements for tracking the motion of a pen to create writing, such as tracking the movement of a ball of a ball point pen, as described above in reference to FIGS. 4-8.

Turning now to 17, a flow diagram shows a method of tracking of text formed by a smart pen. The formation of text or other writing is determined at a block 1702. The movement of the pen is then determined at a block 1704. The location of current text or writing with respect to other text or writing is determined at a block 1706. The detected information is combined to determine and update location information at a block 1708. At least one of the detected information and the determined location information is stored at a block 1710. The detected information and the determined location information can be stored in one or more locations of system as set forth above having memory. According to some implementations, information can be stored on the smart pen, processed on the smart pen to create a composite image which may be stored on the smart pen and/or stored on another device. According to other implementations, the information can be provided to other devices, such as a remote computer or cloud-based computers, where the image data can be processed to create a composite image that may be stored or provided to another device for storage and access later. For example, the information can be stored on cloud-based memory and accessed on the cloud by a user accessing an account using a computer for example.

Figure 18:
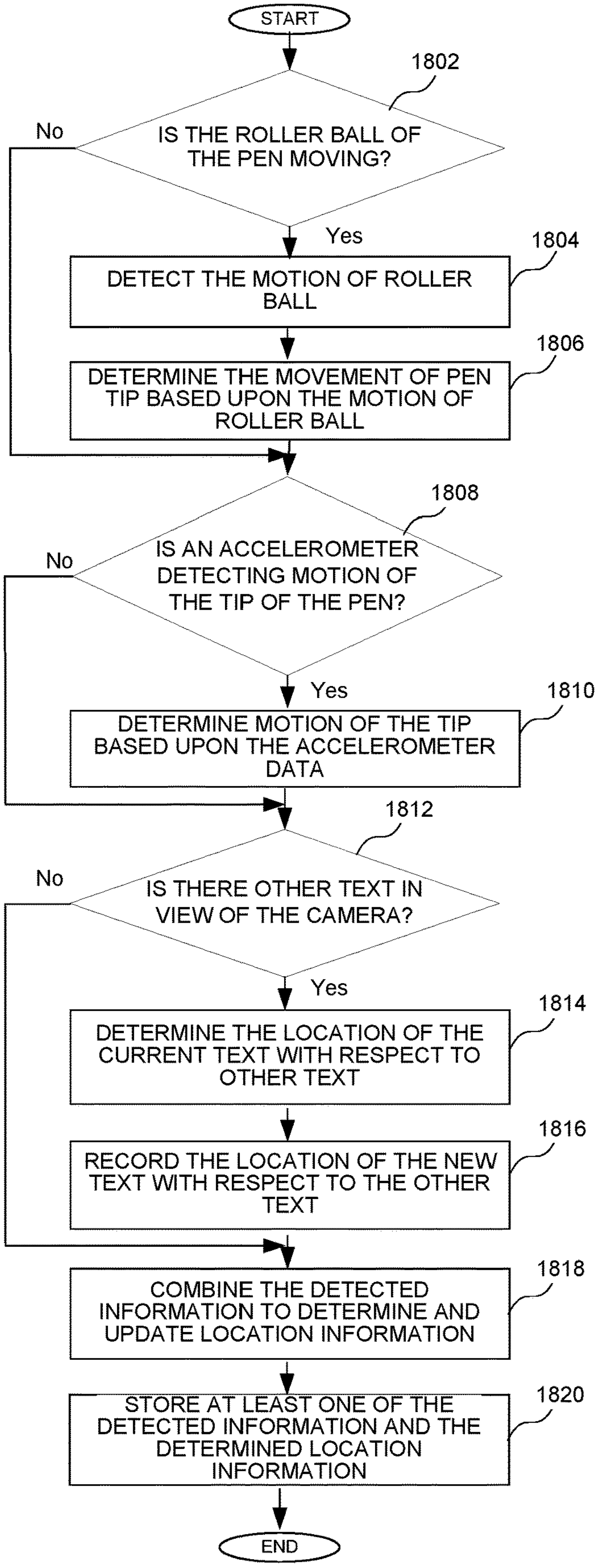
FIG. 18 is another flow diagram showing a method of tracking of text formed by a smart pen.
Figure 19:
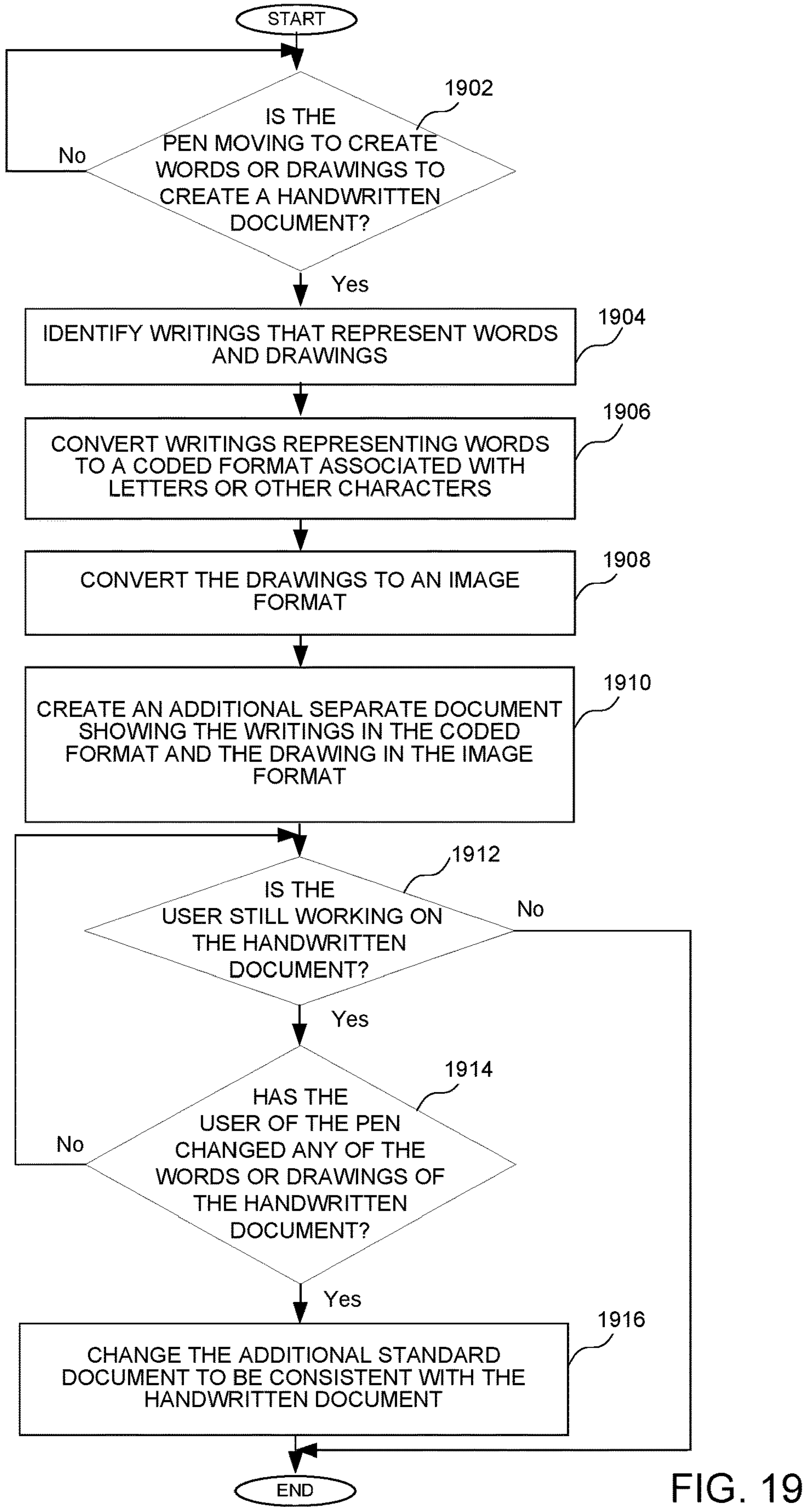
FIG. 19 is a flow diagram showing a method of converting text written with a smart pen to a different format and updating the text in response to user changes.

Turning now to FIG. 18, another flow diagram showing a method of tracking of text formed by a smart pen. It is determined whether the roller ball of the pen moving at a block 1802. If so, the motion of roller ball is detected at a block 1804, and the movement of pen tip is determined based upon the motion of roller ball at a block 1806. It is also determined whether there is an accelerometer detecting motion of the tip of the pen at a block 1808. If so, the motion of the tip is determined based upon the accelerometer data at a block 1810. It is then determined whether there is other text in view of the camera at a block 1812. The location of the current text with respect to other text is determined at a block 1814. The location of the new text with respect to the other text is recorded at a block 1816. The detected information is combined to determine and update location information at a block 1818. At least one of the detected information and the determined location information is stored at a block 1820. Accordingly, information from different detection elements can be used to determine the locations of portions of a writing on a surface, and different writings or objects can be combined to create a composite object.

Turning now to 19, a flow diagram shows the converting of a writing between formats. It is determined whether the pen is moved to create words or drawings to create a handwritten document at a block 1902. If so, writings that represent words and drawings are identified at a block 1904. Writings representing words are converted to a coded format associated with letters or other characters at a block 1906. For example, the words could be converted to an ASCII format for example. The drawings are converted to an image format at a block 1908. For example, the images could be converted to a PDF that is inserted into the document, or the images could be converted to any other type of image format, such as GIF or TIFF for example. An additional separate document showing the writings in the coded format and the drawing in the image format is created at a block 1910. The format of the additional separate document comprising a composite document could also be a PDF, GIF, TIFF document for example. It is then determined whether the user still working on the handwritten document at a block 1912. It is also determined whether the user of the pen has changed any of the words or drawings of the handwritten document at a block 1914. The additional standard document is changed to be consistent with the handwritten document at a block 1916. That is, the formation of the composite document could be created as the user is still working on the document and updated as the user is working on the document, or created when the user is finished with the document.

Figure 20A:
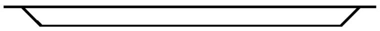
FIG. 20A, FIG. 20B, FIG. 20C, FIG. 20D, FIG. 20E, and FIG. 20F are a series of figures showing the formation of an object, and the tagging of different elements of the object.
Figure 20B:
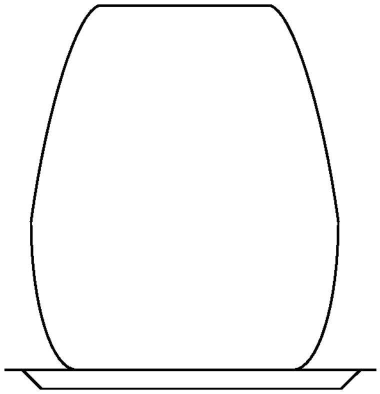
Figure 20C:
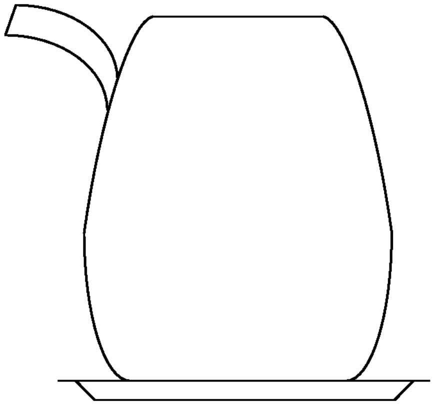
Figure 20D:
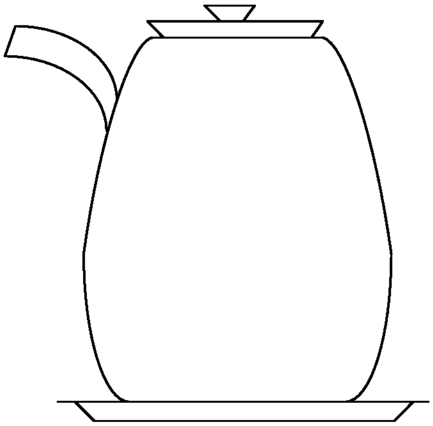
Figure 20E:
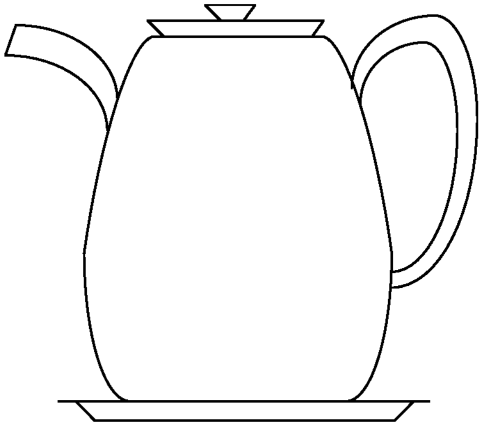
Figure 20F:
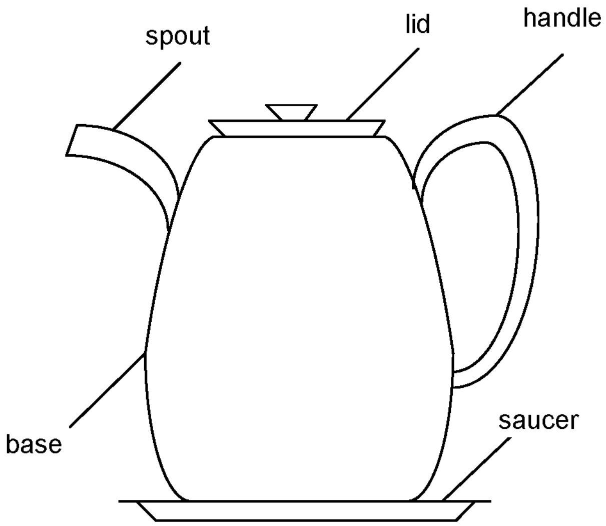
Figure 21:
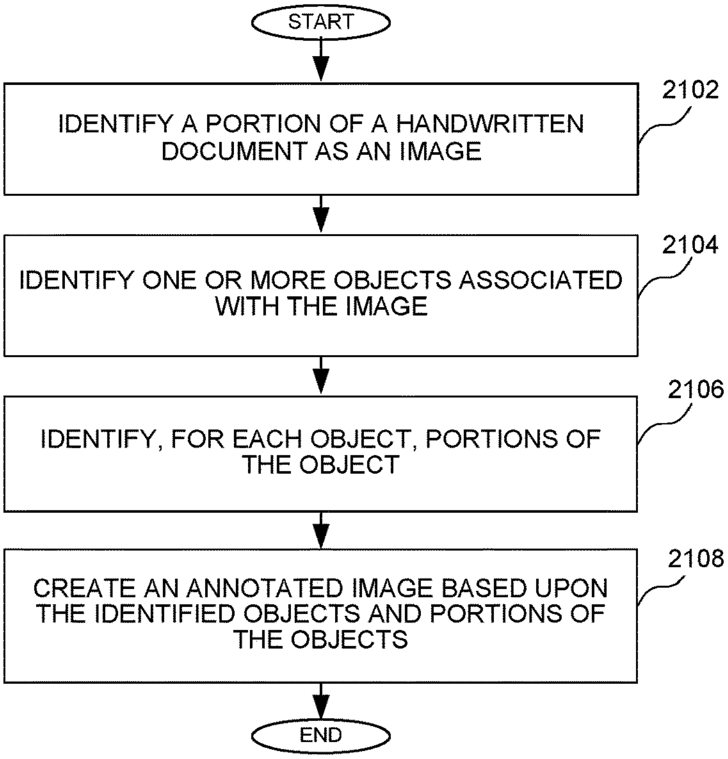
FIG. 21 is a flow diagram showing a method of creating an annotated image based upon identified objects.
Figure 22:
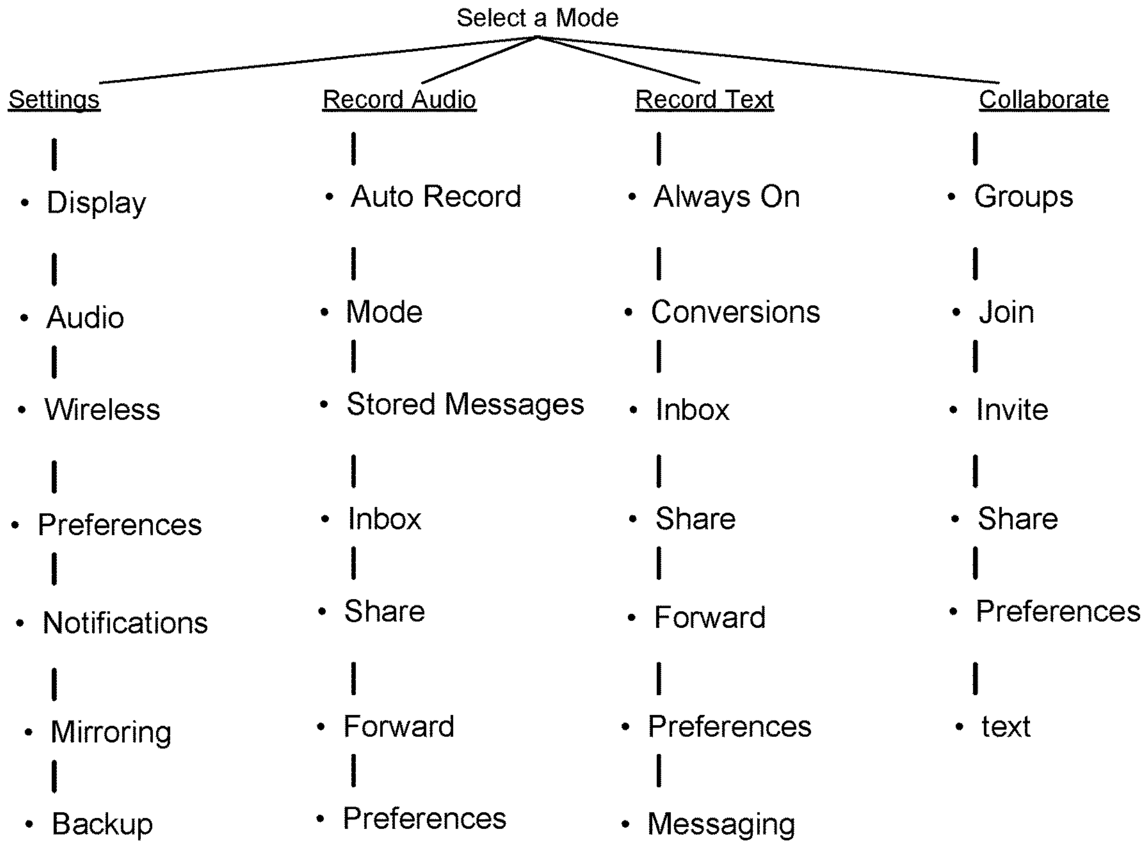
FIG. 22 is a tree diagram showing an exemplary user interface for a smart pen.
Figure 23:
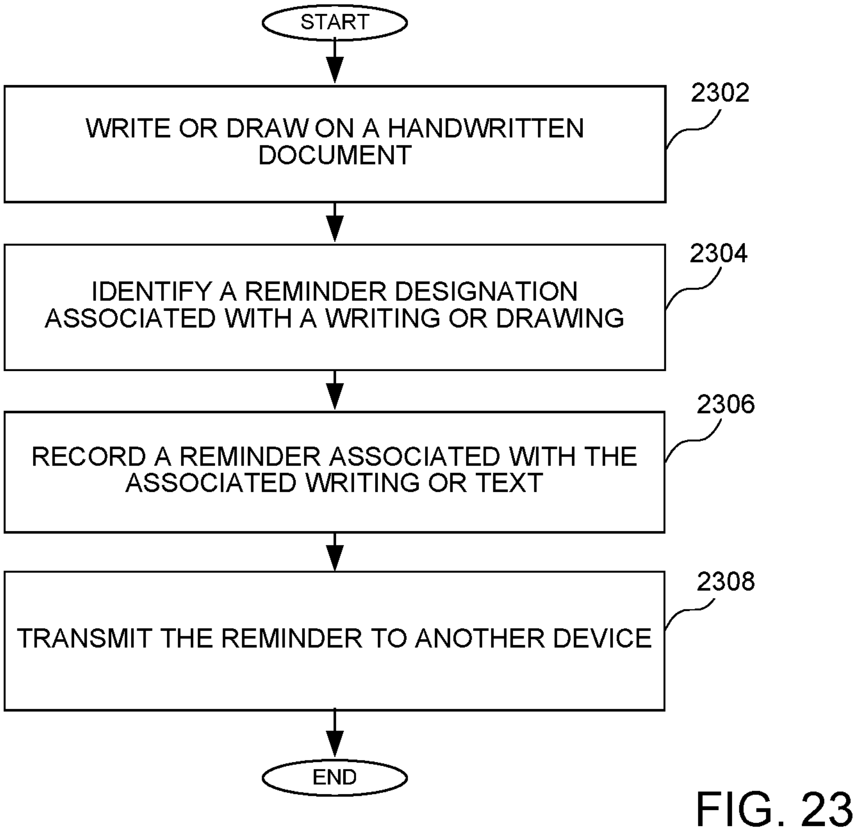
FIG. 23 is a flow diagram showing a method of generating a reminder in response to an input generated by a smart pen.
Figure 24:
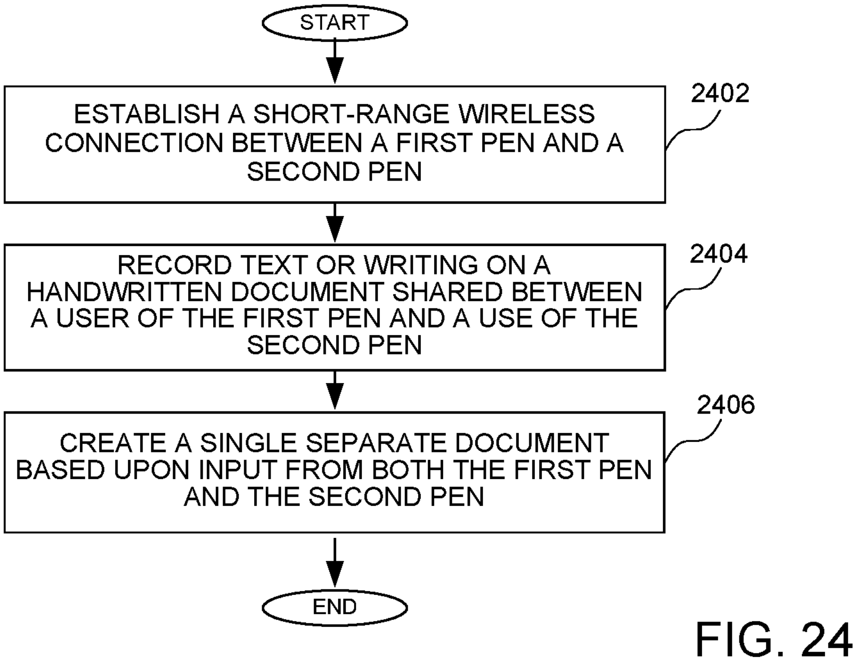
FIG. 24 is a flow diagram showing a method of enabling a document based upon input from multiple smart pens.

Turning now to 20, a series of figures shows the formation of an article, shown here by way of example as a teapot. In a first FIG. 20A, a saucer (for a teapot) is created. While the electronic device may not be able to identify the portion of the drawing as a saucer, it may identify it as a plate initially. After the base portion of the pitcher is drawn in FIG. 20B or FIG. 20C, the electronic device may determine that the article comprises a pitcher, at which time the item as a whole would be identified as a pitcher on a saucer and the portions of the pitcher would be identified. According to one implementation, the drawing could be displayed on another electronic device as an annotated drawing, where portions of the pitcher would be label (i.e. shown with designations next to the individual elements, such as base, spout, lid added in FIG. 20D), a handle added in FIG. 20E, etc.). An example of an annotated version of the drawing is shown in FIG. 20F. It should also be noted that the annotations would be stored with the electronic file associated with the drawing to enable search for elements of the drawing. For example, a search for lid would turn up the drawing, along with other drawings or text that might reference a lid.

Turning now to 21, a flow diagram shows the annotation of an image by identifying the image or portions of the image, such as described above in reference to FIG. 20. A portion of a handwritten document is identified as an image at a block 2102. One or more objects associated with the image is identified at a block 2104. For each object, portions of the object are identified at a block 2106. An annotated image based upon the identified objects and portions of the objects is created at a block 2108.

Turning now to 22, a tree diagram shows an exemplary menu for operation a smart pen. For example, a user may use the cap and display of the smart pen to select a mode, such as a settings mode, a record audio mode, a record text mode and a collaborate mode. In a settings mode, a user may select setting for the display, audio, wireless, preferences, notifications, mirroring (i.e. features related to displaying a document being created by the user to enable other users to access and add to or edit the document) and backup functions for examples. In a record audio mode, a user may be able to select settings for auto recode, a record audio mode, stored messages, and inbox, sharing audio, forwarding audio or other preferences for example. In a record text mode, a user may be able to select different features for monitoring the smart pen, including always on, conversions (i.e. what types of documents the drawings are converted to), inbox, share, forward, preferences, and messaging for example. In a collaborate mode, a user can select collaboration features, such as groups, join, invite, share, preferences, or text for example.

Turning now to 23, a flow diagram of a method of generating reminder associated with a drawing is shown. According to the implementation, a user may be able to provide a marking in the document that represents a reminder, where the reminder would be added to a calendar or reminder feature of the smart pen or some other device associated with the smart pen, such as a laptop or tablet computer. A user of a smart pen writes or draws on a hand-written document at a block 2302. A reminder designation associated with a writing or drawing is identified at a block 2304. A reminder associated with the associated writing or text recorded at a block 2306. The reminder is transmitted to another device at a block 2308.

Turning now to 24, a flow diagram of a method of creating a document using multiple smart pens is shown. According to some implementations, different smart pens may be able to connect and exchange information or enable collaborating on a single document. A short-range wireless connection is established between a first pen and a second pen at a block 2402. Text or writing on a handwritten document shared between a user of the first pen and a use of the second pen can be recorded at a block 2404. A single separate document can be created based upon input from both the first pen and the second pen at a block 2406. For example, a common document accessible by both users of the smart pen may be displayed on a display being viewed by both users in a single location, or separately by the users on displays in different locations.

Figure 25:
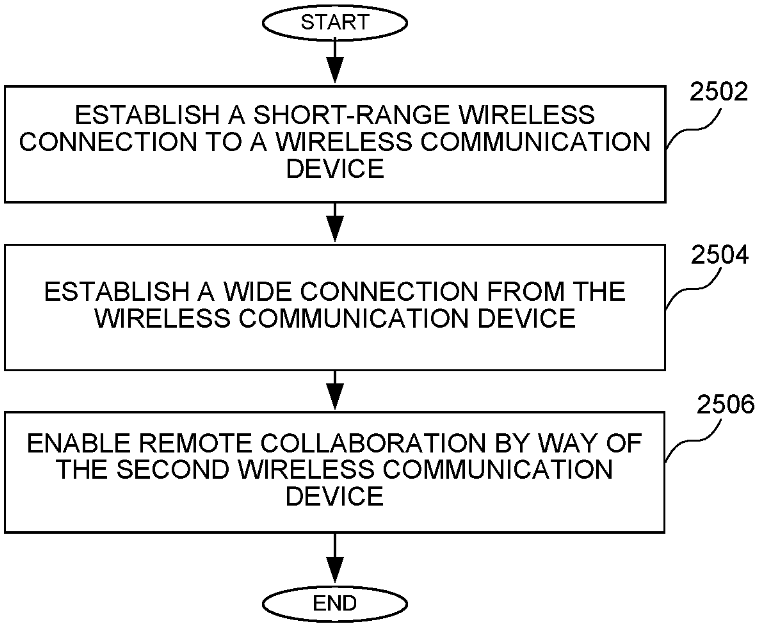
FIG. 25 is a flow diagram showing a method of enabling a remote collaboration using a smart pen.

Turning now to 25, a flow diagram of a method of using a smart pen to collaborate with one or more remote devices is shown. A short range wireless connection to a wireless communication device is established at a block 2502. A wide area connection from the wireless communication device is established at a block 2504. Remote collaboration is enabled by way of the second wireless communication device at a block 2506. Accordingly, the method of FIG. 25 enables a user to interact with other users locally or remotely.

Figure 26:
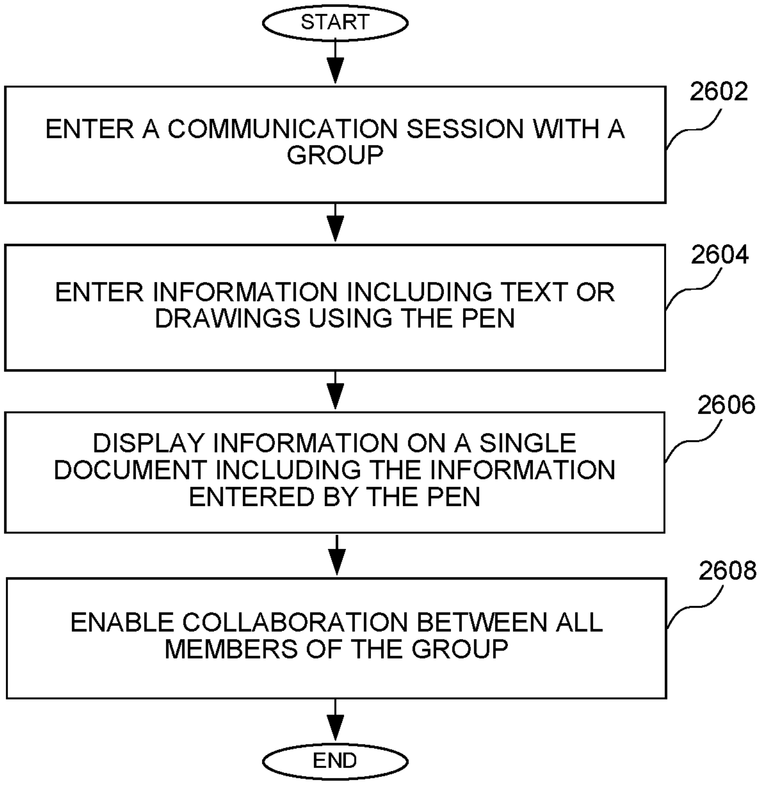
FIG. 26 is a flow diagram showing a method of enabling a remote collaboration using a smart pen.

Turning now to FIG. 26, a flow diagram of a method of using a smart pen to collaborate on a single document with other members of a group is shown. That is, a document could be associated with a group, and multiple users could provide input to the document. A user enters a communication session with a group at a block 2602. Information including text or drawings is entered using the pen at a block 2604. Information is displayed on a single document including the information entered by the pen at a block 2606. Collaboration between all of the members of the group is enabled at a block 2608, where all of the users may contribute to the document.

Accordingly, as described above, a smart pen device which creates a digital replica of the markings that have been written on a physical medium (e.g. paper or white board). The smart pen functions independently of an external element. For example, there is no need for special paper having location markings (e.g. coordinate marking) that may be detected by the digital smart pen device to enable to the digital smart pen device to identify a location of markings made by the digital smart pen device. Therefore, the digital smart pen device can be used with any physical medium that may receive markings, such as a paper receiving pen or pencil markings for example, or a white board adapted to receive an erasable marking. That is, the circuits and methods for implementing a digital smart pen may be implanted with any device that applies a material to a surface, such as ink to paper or an erasable material on a surface adapted to receive the erasable material, such as a non-permeable material found in a white board for example. Further, additional electronics external to the digital smart pen are not required to record and digitize the physical writing. Therefore, a user of the digital smart pen device need only the digital smart pen device to create and record the markings, which may include text, drawings or any type of marking. While the markings may collectively form written text or an object, portions of the marking may be used to identify portions of objects (e.g. portions of letters or a physical object such as a chair or table in a sketch) may be used to detect objects that found in two or more images detected by one or more cameras of the digital smart pen device. Once the markings are recorded, the markings can collectively form a document (which may comprise a single page or multiple pages), where the markings and/or the document can be sent to various digital platforms, thus allowing them to be saved electronically an accessed at a later time by any device having access to the documents.

There is a variety of possible technologies that can be used to implement the smart pen. For example, charged-coupled device (CCD) cameras, which are commonly used in digital cameras, could be implemented. Alternatively, Contact Image Sensor (CIS) technology may be used in order to capture the images, which are often used in portable scanners. CIS cameras are generally cheaper and more light-weight than the more traditional CCD cameras. It should be noted that a combination of different cameras could also be used. The circuits and method may incorporate LED lights and lines of detectors in order to scan the image directly beneath it. Multiple cameras can be placed near the tip of the pen device, close to the surface being written on. As described above, these cameras could surround the pens tip, such that, when combined, the cameras are able to capture a 360-degree view of the area on the writing surface directly surrounding the pen's tip. The cameras may be placed and the portion of the pen having the cameras may be shaped to avoid a user inadvertently covering the camera. As the pen is put into motion by the user, the cameras continuously take snapshots of the region within its view. The snapshots, also known as images or frames, may be taken at a rapid rate. As will be described in more detail below, the cameras may be selectively enabled or disabled depending upon the motion of the digital smart pen device. These snapshot images may be stored in the pen's memory so that they may be accessed frequently. According to some embodiments, the snapshot images may be sent to a remote location (in real time or at a later time).

As the user moves the pen, during handwriting strokes, for example, the pen continues to take images, also known as snapshots. Each new snapshot is compared to one or more previous snapshots, taken just fractions of a second before them. According to some implementations, the snap shots may be taken at a rapid rate. All of the cameras may take a snapshot at once so that they are all aligned in time. According the other implementations, different cameras may take snapshots at different times, where the know delay enables different perspective, but can be taken into account when creating a single image from the multiple images. The rate of taking snap shots may be based upon detected motion of the pen. For example, if it is detected than the smart pen device is moved in a way that may indicate writing, such as moving rapidly (i.e. user is writing or drawing rapidly), the smart pen may take digital snap shots more frequently. The comparison of the snap shots allows the pen to independently track the writings and determine where the writings are relative to the paper (or any other writing surface) which it is writing on.

While various examples may describe writings created with a pen or pencil on paper, it should be understood that the circuits and methods as described may apply to any device applying writings to a surface. The examples of a pen or pencil writing on paper is provided by way of example. According to some implementations, software implemented on a processor of the smart pen device would allow detection of overlapping markings created by pen strokes identified in two or more different images. By comparing the size and location of these identical markings detected by pen strokes within an earlier snapshot to the size and location of the pen strokes within a more recent snapshot, the smart pen device is able to determine the distance and direction of the new pen stroke with respect to the previous pen stroke, and identify locations of markings with respect to one another. As will be described in more detail below, if a user of the smartpen device lifts the tip of the pen off the surface of the writing material, it may be possible to determine relative locations of markings with respect to on another.

Additionally, the cameras surrounding the pen tip may be able to collaborate with each other in order to render one image, using the perspective of some or all of the cameras. This could be useful for many reasons, including simpler storage and access to old images, and creating a single image based upon aggregated information. The camera collaboration may be dependent on each of the cameras surrounding the pen having some sort of overlap with each other, which could be enabled by the physical design of the pen.

Furthermore, since multiple cameras may be functioning simultaneously, certain cameras may be designated to perform various focus levels. This ensures that clear snapshots can be taken, even with the pen moving at rapid speeds across the writing surface or is lifted of the surface. For example, when the pen is creating a writing, a camera that is configured to focus on the writing at a distance from the cameral to the end of the pen tip (i.e. where the pen tip meets the paper) will more quickly and/or accurately (e.g. without having to refocus or change the focus of the camera) focus on and record the writing. According to some implementations, the cameras configured to focus on the writing when the pen tip is making contact with the paper may have a fixed focus. However, other cameras in the array of cameras may focus on writings when the pen is lifted off of the paper. For example, the other cameras may be focused to detect writing when the pen is lifted off the pen based upon an estimated predetermined distance of the pen. For example, it may be determined that typical users of the pen may lift the pen approximately 1 centimeter off the paper when writing. Therefore, some of the cameras may be focused for detecting writings at 1 centimeter off of the paper. The pen may also detect a particular users' writing habits, and set a focus of cameras that are configured to detect writings when the pen is lifted off of the paper at a distance that is appropriate for that user.

Figure 27:
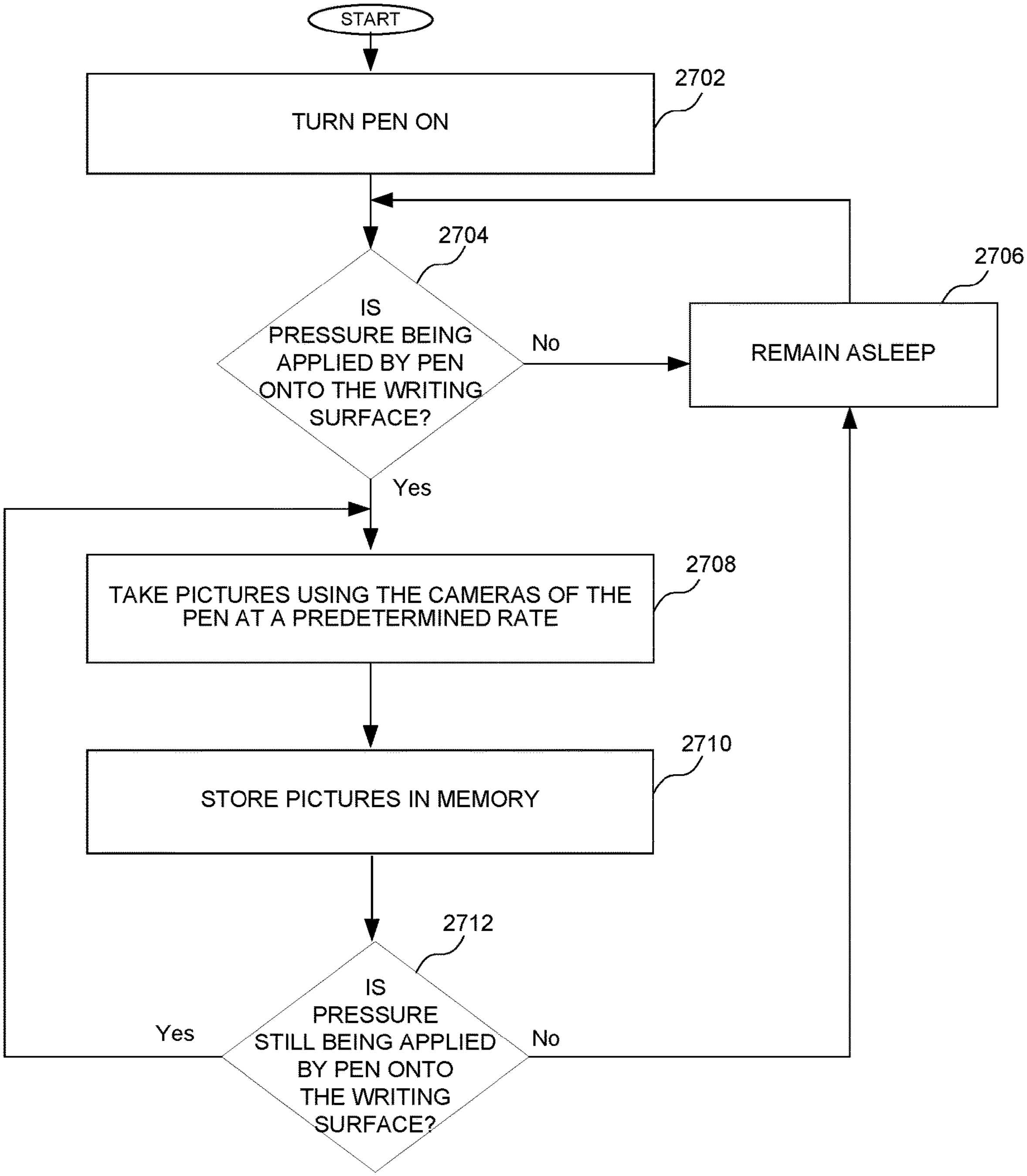
FIG. 27 is a flow chart showing a method of capturing images using a smart pen.

Turning now to FIG. 27, a flow chart shows a method of capturing images using a smart pen. After the pen is turned on at a block 2702, it is determined whether pressure is being applied to the writing surface at a block 2704. If not, the smart pen remains asleep at a block 2706. If pressure is being applied by the pen, the smart pen takes pictures using one or more cameras of the pen at a predetermined rate. The pictures are stored in a memory, such as a memory of the smart pen or remotely, such as in a memory of a computing device, at a block 2710. A computing device could be for example a stand-alone computer, networked computer, laptop, phone, or a device of a cloud storage network. It is then determined if pressure is still being applied by the smart pen onto the writing surface at a block 2712. If so, pictures continue to be taken at the block 2702. If not, the device remains asleep at the block 2706. A single image, which may comprise a composite image for example, my be generated based upon a plurality of images, as will be described in more detail below in reference to FIG. 28.

Figure 28:
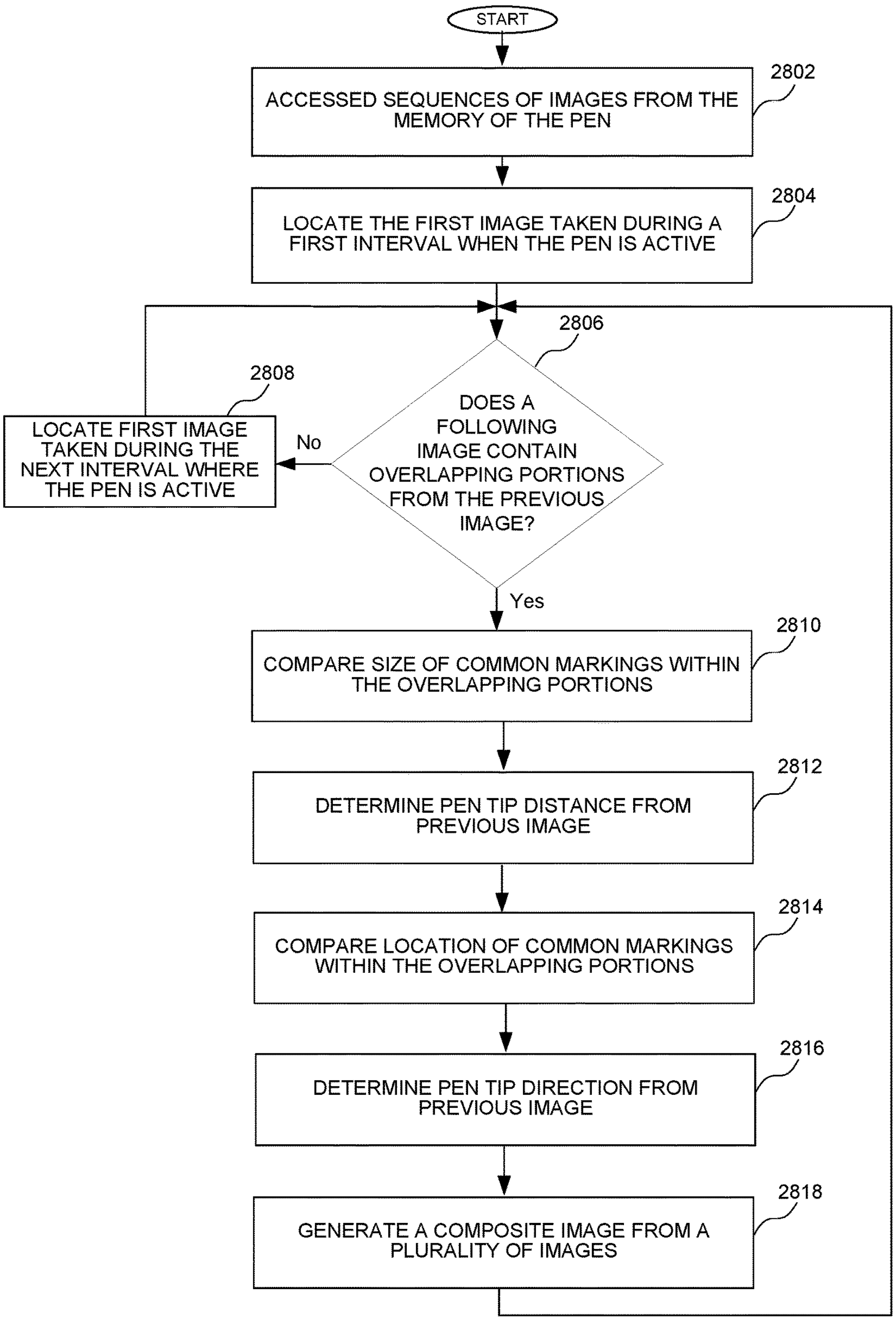
FIG. 28 is a flow chart showing a method of generating a composite image from a plurality of frames.

Turning now to FIG. 28, a flow chart shows a method of generating a composite image from a plurality of images. More particularly, sequences of images are accessed from a memory of the pen at a block 2802. A first image taken during a first interval when the pen is active is located at a block 2804. It is then determined whether a following image contain overlapping portions from the previous image at a block 2806. If not, a first image taken during a next interval where the pen is active is located at a block 2808. If two or more images having overlapping portions or common markings, such a text or objects, or portions of text or objects, the size of the overlapping portions are compared at a block 2810. A distance of the pen tip from the previous image is then determined at a block 2812, and locations of the common markings within the overlapping portions are compared at a block 2814. The direction that the pen tip has travelled from a location in a previous image is determined at a block 2816. A composite image from a plurality of images is the generated at a block 2818. It should be understood that the various determinations, such as the determination of the movement of a pen tip from one image to another or the determination of the pen tip direction from one image to another, can be made using any of the sensors or detection elements of the smart pen, including for example, an accelerometer, an IMU, and one or more cameras, alone or in combination.

Figure 29:
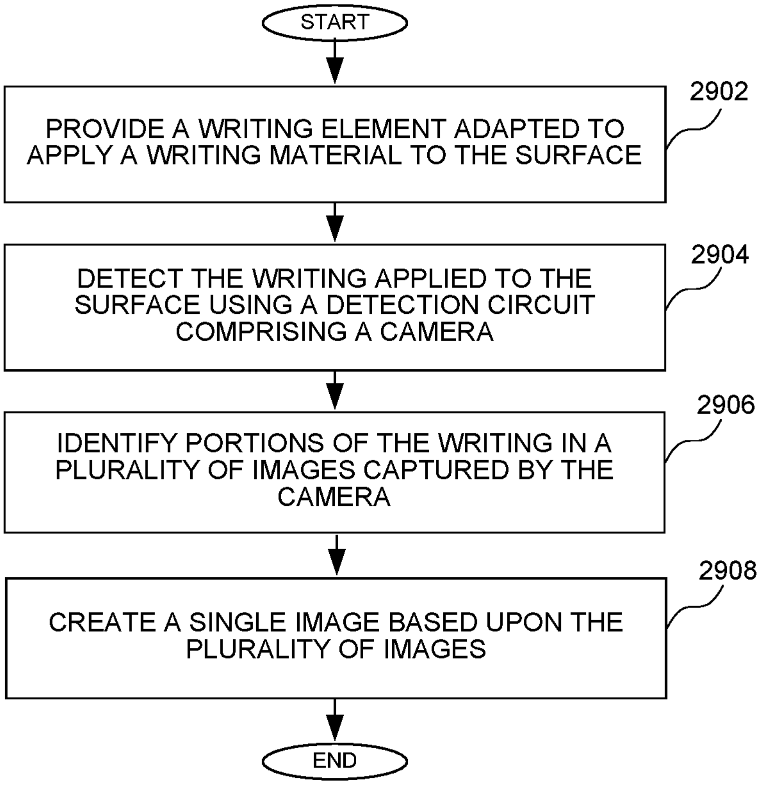
FIG. 29 is a flow chart showing a method of implementing a smart pen.

Turning now to FIG. 29, a flow chart shows a method of implementing a smart pen. A method of implementing an electronic device adapted to apply information to a surface is also described. The method may comprise providing a writing element adapted to apply a writing material to the surface at a block 2902. A detection of the writing applied to the surface using a detection circuit comprising a camera at a block 2904. Portions of the writing in a plurality of images captured by the camera may be identified at a block 2906. A single image may be created based upon the plurality of images at a block 2908.

According to some embodiments, the identifying of portions of the plurality of images may comprise images portions of the information without the use of identification markers on the writing surface, where the portions of the information comprise letters or objects. The method may further comprise detecting a motion of the electronic device, wherein the single image is created based upon the plurality of images and the motion of the electronic device. The method may also comprise communicating the single image to a second electronic device, and enabling collaboration with other devices. The method may further comprise implementing a user interface for at least one of entering information, displaying information, or selecting a mode for the electronic device.

The method may be implemented using the circuits as described as described above, or using some other suitable circuits. While specific elements of the method are described, it should be understood that additional elements of the method, or additional details related to the elements, could be implemented according to the disclosure of the figures.

It can therefore be appreciated that new circuits for and methods of implementing a smart device have been described. It will be appreciated by those skilled in the art that numerous alternatives and equivalents will be seen to exist that incorporate the disclosed invention. As a result, the invention is not to be limited by the foregoing implementations, but only by the following claims.

What is claimed is:

1. An electronic pen device adapted to apply information to a surface, the electronic pen device comprising:

a writing element adapted to apply a writing to the surface;

a detection circuit adapted to detect the writing applied to the surface; and a control circuit coupled to the detection circuit;

wherein the control circuit receives inputs from the detection circuit identifying portions of the writing in a plurality of images captured by the detection circuit to enable creating a single image based upon the plurality of images;

wherein the detection circuit identifies portions of the writing without a use of identification markers on the surface that receives the writing; and wherein the detection circuit identifies a marking which represents a reminder applied to the surface that receives the writing.

2. The electronic pen device of claim 1 further comprising a second detection circuit comprising a motion detector adapted to detect a motion of the electronic pen device with respect to the surface.

3. The electronic pen device of claim 1 wherein the detection circuit comprises a camera.

4. The electronic pen device of claim 3 further comprising second camera generating a second plurality of images, wherein the single image is created based upon the plurality of images and the second plurality of images.

5. The electronic pen device of claim 1 further comprising a transmitter circuit for sending at least one of the plurality of images or the single image to a second electronic pen device.

6. The electronic pen device of claim 1 further comprising adding the reminder to at least one of a calendar of the electronic pen device and a calendar of another device.

7. The electronic pen device of claim 1 further comprising sending the reminder to another device.

8. An electronic pen device adapted to apply information to a surface, the electronic pen device comprising:

a writing element adapted to apply a writing to the surface;

a first detection circuit adapted to detect the writing applied to the surface;

a second detection circuit comprising a motion detector adapted to detect a motion of the electronic pen device with respect to the surface; and a control circuit coupled to the first detection circuit and the second detection circuit, wherein the control circuit receives inputs from the first detection circuit identifying portions of the writing and inputs from the second detection circuit associated with motions of the electronic pen device to enable creating an image;

wherein the first detection circuit identifies portions of the writing without a use of identification markers on the surface that receives the writing; and wherein the first detection circuit identifies a marking which represents a reminder applied to the surface that receives the writing.

9. The electronic pen device of claim 8 further comprising a transmitter circuit configured to transmit the image based upon a plurality of images to another electronic pen device.

10. The electronic pen device of claim 8 wherein the portions of the writing comprise letters or objects.

11. The electronic pen device of claim 8 wherein the first detection circuit comprises a camera, the electronic pen device further comprising a second camera, wherein the image is created based upon images from the camera and the second camera.

12. The electronic pen device of claim 8 further comprising adding the reminder to at least one of a calendar of the electronic pen device and a calendar of another device.

13. The electronic pen device of claim 8 further comprising sending the reminder to another device.

14. A method of implementing an electronic pen device adapted to apply information to a surface, the method comprising:

providing a writing element adapted to apply a writing to the surface;

detecting the writing applied to the surface using a detection circuit;

detecting a motion of the electronic pen device with respect to the surface;

identifying portions of the writing in a plurality of images captured by the detection circuit;

identifying a marking that represents a reminder applied to the surface that receives the writing; and creating a single image based upon the plurality of images;

wherein the writing applied to the surface is detected without the use of identification markers on the surface that receives the writing.

15. The method of claim 14 wherein detecting the writing applied to the surface using a detection circuit comprises detecting the writing using a camera.

16. The method of claim 15 further comprising detecting the writing applied to the surface using a second camera.

17. The method of claim 14 wherein detecting a motion of the electronic pen device comprises detecting the motion using a motion detector.

18. The method of claim 14 further comprising communicating the single image to a second electronic pen device.

19. The method of claim 14 further comprising adding the reminder to at least one of a calendar of the electronic pen device and a calendar of another device.

20. The method of claim 14 further comprising sending the reminder to another device.

* * * * *